(12) United States Patent
Kitano et al.

(10) Patent No.: US 9,627,137 B2
(45) Date of Patent: *Apr. 18, 2017

(54) MULTILAYER CERAMIC CAPACITOR

(71) Applicant: Murata Manufacturing Co., Ltd., Nagaokakyo-shi, Kyoto-fu (JP)

(72) Inventors: Shota Kitano, Nagaokakyo (JP); Takanobu Katsuyama, Nagaokakyo (JP); Hiroaki Sugita, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 92 days.

This patent is subject to a terminal disclaimer.

(21) Appl. No.: 14/645,722

(22) Filed: Mar. 12, 2015

(65) Prior Publication Data

US 2016/0049245 A1 Feb. 18, 2016

(30) Foreign Application Priority Data

Aug. 13, 2014 (JP) ................................. 2014-164956

(51) Int. Cl.
*H01G 4/30* (2006.01)
*H01G 4/248* (2006.01)
(Continued)

(52) U.S. Cl.
CPC ........... *H01G 4/248* (2013.01); *H01G 4/1227* (2013.01); *H01G 4/232* (2013.01); *H01G 4/30* (2013.01); *H01G 2/06* (2013.01)

(58) Field of Classification Search
CPC .. H01G 4/30; H01G 4/06; H01G 4/12; H01G 4/228; H01G 4/012
See application file for complete search history.

(56) References Cited

U.S. PATENT DOCUMENTS

2012/0300361 A1 11/2012 Togashi
2013/0038979 A1 2/2013 Togashi
(Continued)

FOREIGN PATENT DOCUMENTS

JP 06-215978 A 8/1994
JP 07-045469 A 2/1995
(Continued)

*Primary Examiner* — Nguyen Ha
(74) *Attorney, Agent, or Firm* — Keating & Bennett, LLP

(57) ABSTRACT

A multilayer ceramic capacitor includes a multilayer unit, thickness-direction first and second outer layer sections, length-direction first and second outer layer sections, and width-direction first and second outer layer sections. A dimension of the thickness-direction second outer layer section is greater than a dimension of the thickness-direction first outer layer section. The thickness-direction second outer layer section includes an inner portion and an outer portion. A composition ratio of Si to Ti in a ceramic dielectric layer included in the outer portion is higher than that in the inner portion. A boundary portion between the outer portion and the inner portion has a larger Si content than the outer portion. The inner portion has a higher composition ratio of Mn to Ti than the outer portion. Each of minimum dimensions in the length direction of the length-direction first and second outer layer sections is greater than both dimensions in the width direction of the width-direction first and second outer layer sections.

13 Claims, 24 Drawing Sheets

(51) Int. Cl.
  *H01G 4/12* (2006.01)
  *H01G 4/232* (2006.01)
  *H01G 2/06* (2006.01)

(56) References Cited

U.S. PATENT DOCUMENTS

| | | |
|---|---|---|
| 2013/0233606 A1 | 9/2013 | Fujii et al. |
| 2013/0319741 A1 | 12/2013 | Ahn et al. |
| 2014/0020942 A1 | 1/2014 | Cho et al. |
| 2014/0083755 A1 | 3/2014 | Lee et al. |
| 2014/0131082 A1 | 5/2014 | Ahn et al. |
| 2014/0151102 A1 | 6/2014 | Lee et al. |
| 2014/0153155 A1 | 6/2014 | Fujii et al. |
| 2014/0166351 A1 | 6/2014 | Lee et al. |
| 2016/0049246 A1* | 2/2016 | Kitano ............... H01G 4/30 361/301.4 |
| 2016/0049247 A1* | 2/2016 | Kitano ............... H01G 4/30 361/301.4 |

FOREIGN PATENT DOCUMENTS

| | | |
|---|---|---|
| JP | 2012-248581 A | 12/2012 |
| JP | 2014-027085 A | 2/2014 |
| JP | 2014-033097 A | 2/2014 |

\* cited by examiner

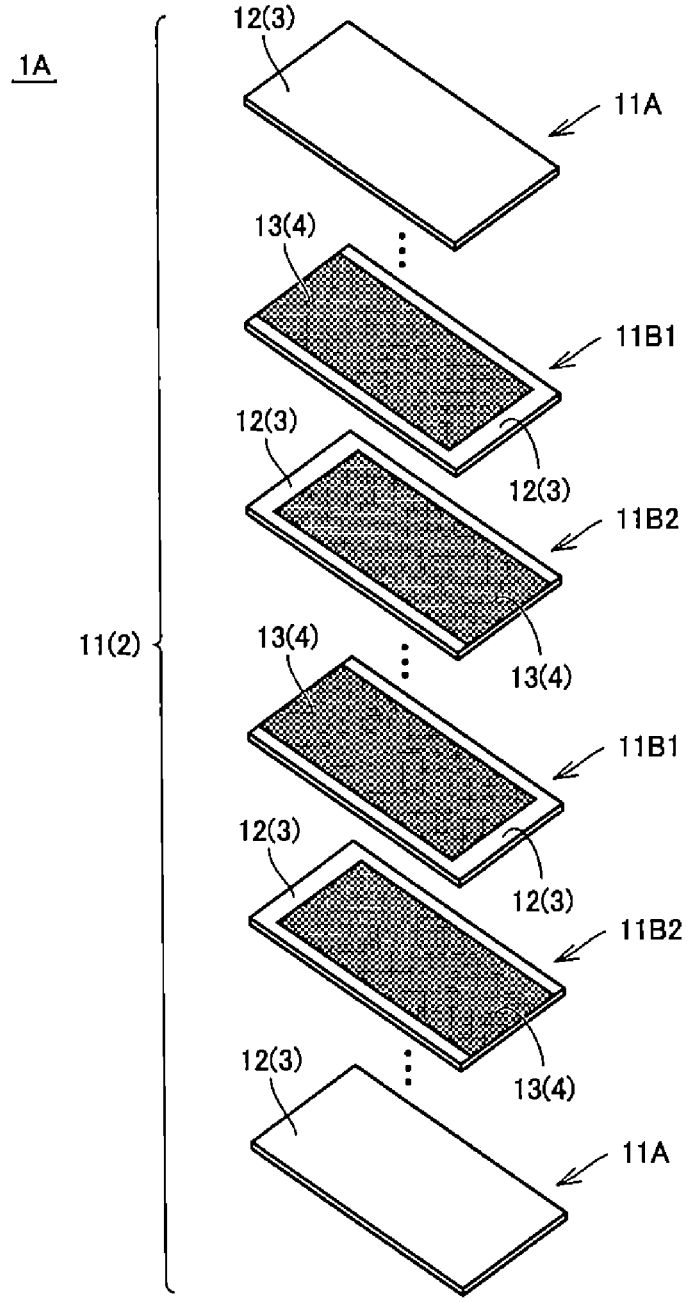

FIG. 18

| EXAMPLE NO. | DESIGN CONDITIONS | | | | | | | | | | | | EVALUATION RESULTS | |
|---|---|---|---|---|---|---|---|---|---|---|---|---|---|---|
| | BODY | | | MULTILAYER UNIT | | | THICKNESS-DIRECTION FIRST OUTER LAYER SECTION t1 [μm] | THICKNESS-DIRECTION SECOND OUTER LAYER SECTION t2 [μm] | LONGITUDINAL-DIRECTION FIRST (SECOND) OUTER LAYER SECTION l1,l2 [μm] | WIDTHWISE-DIRECTION FIRST (SECOND) OUTER LAYER SECTION w1,w2 [μm] | DIMENSION RATIOS | | | OCCURRENCE OF CRACKS | |
| | T0 [μm] | L0 [μm] | W0 [μm] | T1 [μm] | L1 [μm] | W1 [μm] | | | | | w1/t1, w2/t1 | T1/W1 | AR1 | AFTER FIRING | AFTER THERMAL SHOCK |
| 1 | 820 | 1220 | 720 | 640 | 1100 | 640 | 40 | 140 | 60 | 40 | 1.0 | 1.00 | 8.00 | NO | NO |
| 2 | 857 | 1220 | 720 | 677 | 1100 | 640 | 40 | 140 | 60 | 40 | 1.0 | 1.06 | 8.46 | YES | YES |
| 3 | 857 | 1220 | 744 | 677 | 1100 | 640 | 40 | 140 | 60 | 52 | 1.3 | 1.06 | 6.51 | NO | NO |
| 4 | 898 | 1220 | 744 | 718 | 1100 | 640 | 40 | 140 | 60 | 52 | 1.3 | 1.12 | 6.90 | NO | NO |
| 5 | 916 | 1220 | 744 | 736 | 1100 | 640 | 40 | 140 | 60 | 52 | 1.3 | 1.15 | 7.08 | NO | YES |
| 6 | 916 | 1220 | 760 | 736 | 1100 | 640 | 40 | 140 | 60 | 60 | 1.5 | 1.15 | 6.13 | NO | NO |
| 7 | 1014 | 1220 | 760 | 834 | 1100 | 640 | 40 | 140 | 60 | 60 | 1.5 | 1.30 | 6.95 | NO | NO |

FIG. 19

| EXAMPLE NO. | DESIGN CONDITIONS ||||||||||| DIMENSION RATIOS ||| EVALUATION RESULTS OCCURRENCE OF CRACKS ||
|---|---|---|---|---|---|---|---|---|---|---|---|---|---|---|---|
| | BODY |||| MULTILAYER UNIT ||| THICKNESS-DIRECTION FIRST OUTER LAYER SECTION t1 [μm] | THICKNESS-DIRECTION SECOND OUTER LAYER SECTION t2 [μm] | LONGITUDINAL-DIRECTION FIRST (SECOND) OUTER LAYER SECTION l1,l2 [μm] | WIDTHWISE-DIRECTION FIRST (SECOND) OUTER LAYER SECTION w1,w2 [μm] | l1/t1, l2/t1 | T1/L1 | AR2 | AFTER FIRING | AFTER THERMAL SHOCK |
| | T0 [μm] | L0 [μm] | W0 [μm] | T1 [μm] | L1 [μm] | W1 [μm] | | | | | | | | | |
| 8 | 820 | 1180 | 752 | 640 | 1100 | 640 | 40 | 140 | 40 | 56 | 1.0 | 0.58 | 8.00 | NO | NO |
| 9 | 857 | 1180 | 752 | 677 | 1100 | 640 | 40 | 140 | 40 | 56 | 1.0 | 0.62 | 8.46 | YES | YES |
| 10 | 857 | 1220 | 752 | 677 | 1100 | 640 | 40 | 140 | 60 | 56 | 1.5 | 0.62 | 5.64 | NO | NO |
| 11 | 898 | 1220 | 752 | 718 | 1100 | 640 | 40 | 140 | 60 | 56 | 1.5 | 0.65 | 5.98 | NO | NO |
| 12 | 916 | 1220 | 752 | 736 | 1100 | 640 | 40 | 140 | 60 | 56 | 1.5 | 0.67 | 6.13 | NO | YES |
| 13 | 916 | 1260 | 752 | 736 | 1100 | 640 | 40 | 140 | 80 | 56 | 2.0 | 0.67 | 4.60 | NO | NO |
| 14 | 1014 | 1260 | 752 | 834 | 1100 | 640 | 40 | 140 | 80 | 56 | 2.0 | 0.76 | 5.21 | NO | NO |

FIG. 20

| EXAMPLE NO. | DESIGN CONDITIONS | | | | | EVALUATION RESULTS | |
|---|---|---|---|---|---|---|---|
| | Si CONTENT IN INNER LAYER [mol%] | Si CONTENT IN OUTER LAYER [mol%] | DIFFERENCE BETWEEN Si CONTENT IN INNER LAYER AND Si CONTENT IN OUTER LAYER [mol%] | INNER LAYER t21 [μm] | OUTER LAYER t22 [μm] | OCCURRENCE OF CRACKS AFTER FIRING | RELIABILITY |
| 15 | 1.3 | 1.7 | 0.4 | 10 | 90 | NO | GOOD |
| 16 | 1.3 | 1.7 | 0.4 | 20 | 80 | NO | GOOD |
| 17 | 1.3 | 1.7 | 0.4 | 30 | 70 | NO | GOOD |
| 18 | 1.3 | 1.7 | 0.4 | 40 | 60 | NO | GOOD |
| 19 | 1.3 | 1.7 | 0.4 | 50 | 50 | NO | GOOD |
| 20 | 1.3 | 1.7 | 0.4 | 60 | 40 | YES | GOOD |
| 21 | 1.3 | 1.7 | 0.4 | 70 | 30 | YES | GOOD |
| 22 | 1.3 | 2.9 | 1.6 | 10 | 90 | NO | GOOD |
| 23 | 1.3 | 2.9 | 1.6 | 20 | 80 | NO | GOOD |
| 24 | 1.3 | 2.9 | 1.6 | 30 | 70 | NO | GOOD |
| 25 | 1.3 | 2.9 | 1.6 | 40 | 60 | NO | GOOD |
| 26 | 1.3 | 2.9 | 1.6 | 50 | 50 | NO | GOOD |
| 27 | 1.3 | 2.9 | 1.6 | 60 | 40 | YES | GOOD |
| 28 | 1.3 | 2.9 | 1.6 | 70 | 30 | YES | GOOD |
| 29 | 1.3 | 3.3 | 2.0 | 10 | 90 | NO | BAD |
| 30 | 1.3 | 3.3 | 2.0 | 20 | 80 | NO | GOOD |
| 31 | 1.3 | 3.3 | 2.0 | 30 | 70 | NO | GOOD |
| 32 | 1.3 | 3.3 | 2.0 | 40 | 60 | NO | GOOD |
| 33 | 1.3 | 3.3 | 2.0 | 50 | 50 | NO | GOOD |
| 34 | 1.3 | 3.3 | 2.0 | 60 | 40 | YES | GOOD |
| 35 | 1.3 | 3.3 | 2.0 | 70 | 30 | YES | GOOD |

FIG. 21

| EXAMPLE NO. | DESIGN CONDITIONS | | | | | EVALUATION RESULTS |
|---|---|---|---|---|---|---|
| | Si CONTENT IN INNER LAYER [mol%] | Si CONTENT IN OUTER LAYER [mol%] | DIFFERENCE BETWEEN Si CONTENT IN INNER LAYER AND Si CONTENT IN OUTER LAYER [mol%] | INNER LAYER t21 [μm] | OUTER LAYER t22 [μm] | OCCURRENCE OF CRACKS DUE TO APPLICATION OF EXTERNAL STRESS |
| 36 | 1.3 | 1.7 | 0.4 | 50 | 50 | NO |
| 37 | 1.7 | 1.7 | 0 | 50 | 50 | YES |
| 38 | 1.3 | 2.9 | 1.6 | 50 | 50 | NO |
| 39 | 2.9 | 2.9 | 0 | 50 | 50 | YES |

MULTILAYER CERAMIC CAPACITOR

BACKGROUND OF THE INVENTION

1. Field of the Invention

The present invention relates to a multilayer ceramic capacitor, and a multilayer ceramic capacitor array including a multilayer ceramic capacitor.

2. Description of the Related Art

Generally, a capacitor device includes a body constituted by alternately stacking inner electrode layers and dielectric layers and outer electrodes disposed on the outer surfaces of the body. In a multilayer ceramic capacitor, the dielectric layers are constituted by a ceramic dielectric material.

Generally, the body of a multilayer ceramic capacitor is formed as follows. The body contains a multilayer unit having a substantially rectangular parallelepiped shape and formed by alternately and densely stacking a plurality of conductive layers, which serve as inner electrode layers, and a plurality of ceramic dielectric layers. Outer layer sections constituted by ceramic dielectric layers and outer layer sections constituted by ceramic dielectric layers and a relatively small number of conductive layers disposed within the ceramic dielectric layers cover the multilayer unit.

In the above-described multilayer ceramic capacitor, the occurrence of cracks in the above-described ceramic dielectric layers may be observed. The occurrence of cracks reduces the reliability of a multilayer ceramic capacitor as a product or decreases the yield in a manufacturing process.

An example of a technique for reducing the occurrence of cracks in a multilayer ceramic capacitor is disclosed in Japanese Unexamined Patent Application Publication No. 2012-248581. In this multilayer ceramic capacitor, a pair of outer layer sections constituted by ceramic dielectric layers that sandwich the above-described multilayer unit therebetween in the stacking direction is provided. In this pair of outer layer sections, one outer layer section that defines the principal surface of the multilayer unit to be mounted on a wiring board is thicker than the other outer layer section.

In this multilayer ceramic capacitor, it is possible to reduce the occurrence of cracks caused by an external stress which is applied to the multilayer ceramic capacitor when the wiring board having the multilayer ceramic capacitor mounted thereon is deflected due to an external force.

However, as a result of conducting an extensive study, the present inventors have discovered the following fact concerning the above-described multilayer ceramic capacitor. If the thickness of the above-described other outer layer section is increased or if the thickness of the above-described multilayer unit is increased, cracks occur at the boundary between the multilayer unit and the outer layer section when the body of the multilayer ceramic capacitor is subjected to firing. Unlike the above-described cracks due to an external stress, this type of crack may occur due to an internal stress produced by the difference in the coefficients of thermal shrinkage between the ceramic dielectric layers and the conductive layers when the body of the multilayer ceramic capacitor is subjected to firing.

SUMMARY OF THE INVENTION

Various preferred embodiments of the present invention has been developed based on the above-described findings. Accordingly, various preferred embodiments of the present invention provide a multilayer ceramic capacitor in which it is possible to significantly reduce or prevent the occurrence of cracks caused by an internal stress produced by a difference in coefficient of thermal shrinkage between a ceramic dielectric layer and a conductive layer, and a multilayer ceramic capacitor array including this multilayer ceramic capacitor and a multilayer ceramic capacitor mount body including this multilayer ceramic capacitor.

According to a preferred embodiment of the present invention, a multilayer ceramic capacitor includes a body including conductive layers and ceramic dielectric layers alternately stacked on each other in a thickness direction, and a plurality of outer electrodes disposed on portions of the body, wherein the body includes first and second principal surfaces opposing each other in the thickness direction, first and second end surfaces opposing each other in a length direction, and first and second side surfaces opposing each other in a width direction, the plurality of outer electrodes includes a first outer electrode covering at least the first end surface and a second outer electrode covering at least the second end surface, some of the conductive layers include a first effective portion and a first extension portion extending from the first effective portion toward the first end surface and connecting to the first outer electrode, and others of the conductive layers include a second effective portion and a second extension portion extending from the second effective portion toward the second end surface and connecting to the second outer electrode, the body includes a multilayer unit including an effective portion defined by the first and second effective portions and portions of the ceramic dielectric layers stacked therebetween, the body is sectioned in the thickness direction into a thickness-direction first outer layer section that includes one of the ceramic dielectric layers including the first principal surface, a thickness-direction second outer layer section that includes one of the ceramic dielectric layers including the second principal surface, and a thickness-direction inner layer section that includes the multilayer unit and that is disposed between the thickness-direction first and second outer layer sections, the body is sectioned in the length direction into a length-direction first outer layer section that includes the first extension portions and portions of the ceramic dielectric layers sandwiched by the first extension portions and that defines the first end surface, a length-direction second outer layer section that includes the second extension portions and portions of the ceramic dielectric layers sandwiched by the second extension portions and that defines the second end surface, and a length-direction inner layer section that includes the multilayer unit and that is disposed between the length-direction first and second outer layer sections, the body is sectioned in the width direction into a width-direction first outer layer section that includes a portion between the first side surface and the multilayer unit, a width-direction second outer layer section that includes a portion between the second side surface and the multilayer unit, and a width-direction inner layer section that includes the multilayer unit and that is disposed between the width-direction first and second outer layer sections, a dimension of the thickness-direction second outer layer section in the thickness direction is greater than a dimension of the thickness-direction first outer layer section in the thickness direction, the ceramic dielectric layers included in the thickness-direction inner layer section and the thickness-direction first and second outer layer sections contains barium titanate and Si, the thickness-direction second outer layer section includes an outer portion which includes the second principal surface and an inner portion disposed between the thickness-direction inner layer section and the outer portion, a composition ratio of Si to Ti in one of the ceramic dielectric layers included in the outer portion is higher than a composition ratio of Si to Ti in one of the ceramic dielectric layers included in the inner portion, a boundary portion between the outer portion and the inner portion has a larger Si content than the outer portion, the inner portion has a higher composition ratio of Mn to Ti than the outer portion, and each of minimum dimensions in the length direction of the length-direction first and second outer layer sections is greater than both minimum dimensions in the width direction of the width-direction first and second outer layer sections.

In the above-described multilayer ceramic capacitor according to a preferred embodiment of the present invention, it is preferable that the ceramic dielectric layers included in the multilayer unit have a higher composition ratio of rare earth element to Ti than the outer portion.

In the above-described multilayer ceramic capacitor according to a preferred embodiment of the present invention, it is preferable that the ceramic dielectric layers included in the multilayer unit have a higher composition ratio of Dy to Ti than the outer portion.

In the above-described multilayer ceramic capacitor according to a preferred embodiment of the present invention, it is preferable that a dimension of the outer portion in the thickness direction is greater than a dimension of the inner portion in the thickness direction.

According to another preferred embodiment of the present invention, a multilayer ceramic capacitor includes a body including conductive layers and ceramic dielectric layers alternately stacked on each other in a thickness direction, and a plurality of outer electrodes disposed on portions of the body, wherein the body includes first and second principal surfaces opposing each other in the thickness direction, first and second end surfaces opposing each other in a length direction, and first and second side surfaces opposing each other in a width direction, the plurality of outer electrodes includes a first outer electrode covering at least the first end surface and a second outer electrode covering at least the second end surface, some of the conductive layers include a first effective portion and a first extension portion extending from the first effective portion toward the first end surface and connecting to the first outer electrode, and others of the conductive layers include a second effective portion and a second extension portion extending from the second effective portion toward the second end surface and connecting to the second outer electrode, the body includes a multilayer unit including an effective portion defined by the first and second effective portions and portions of the ceramic dielectric layers stacked therebetween, the body is sectioned in the thickness direction into a thickness-direction first outer layer section that includes one of the ceramic dielectric layers including the first principal surface, a thickness-direction second outer layer section that includes one of the ceramic dielectric layers including the second principal surface, and a thickness-direction inner layer section that includes the multilayer unit and that is disposed between the thickness-direction first and second outer layer sections, the body is sectioned in the length direction into a length-direction first outer layer section that includes the first extension portions and portions of the ceramic dielectric layers sandwiched by the first extension portions and that defines the first end surface, a length-direction second outer layer section that includes the second extension portions and portions of the ceramic dielectric layers sandwiched by the second extension portions and that defines the second end surface, and a length-direction inner layer section that includes the multilayer unit and that is disposed between the length-direction first and second outer layer sections, the body is sectioned in the width direction into a width-direction first outer layer section that includes a portion between the first side surface and the multilayer unit, a width-direction second outer layer section that includes a portion between the second side surface and the multilayer unit, and a width-direction inner layer section that includes the multilayer unit and that is disposed between the width-direction first and second outer layer sections, a dimension of the thickness-direction second outer layer section in the thickness direction is greater than a dimension of the thickness-direction first outer layer section in the thickness direction, the ceramic dielectric layers included in the thickness-direction inner layer section and the thickness-direction first and second outer layer sections contains barium titanate and Si, the thickness-direction second outer layer section includes an outer portion which includes the second principal surface and an inner portion disposed between the thickness-direction inner layer section and the outer portion, a composition ratio of Si to Ti in one of the ceramic dielectric layers included in the outer portion is higher than a composition ratio of Si to Ti in one of the ceramic dielectric layers included in the inner portion, a boundary portion between the outer portion and the inner portion has a larger Si content than the outer portion, the inner portion has a higher composition ratio of Mn to Ti than the outer portion, and each of minimum dimensions in the length direction of the length-direction first and second outer layer sections is more than about 1.15 times as large as both minimum dimensions in the width direction of the width-direction first and second outer layer sections.

In the above-described multilayer ceramic capacitor according to a preferred embodiment of the present invention, it is preferable that the ceramic dielectric layers included in the multilayer unit have a higher composition ratio of rare earth element to Ti than the outer portion.

In the above-described multilayer ceramic capacitor according to a preferred embodiment of the present invention, it is preferable that the ceramic dielectric layers included in the multilayer unit have a higher composition ratio of Dy to Ti than the outer portion.

In the above-described multilayer ceramic capacitor according to a preferred embodiment of the present invention, it is preferable that a dimension of the outer portion in the thickness direction is greater than a dimension of the inner portion in the thickness direction.

According to a further preferred embodiment of the present invention, a multilayer ceramic capacitor includes a body including conductive layers and ceramic dielectric layers alternately stacked on each other in a thickness direction, and a plurality of outer electrodes disposed on portions of the body, wherein the body includes first and second principal surfaces opposing each other in the thickness direction, first and second end surfaces opposing each other in a length direction, and first and second side surfaces opposing each other in a width direction, the plurality of outer electrodes includes a first outer electrode covering at least the first end surface and a second outer electrode covering at least the second end surface, some of the conductive layers include a first effective portion and a first extension portion extending from the first effective portion toward the first end surface and connecting to the first outer electrode, and others of the conductive layers include a second effective portion and a second extension portion extending from the second effective portion toward the second end surface and connecting to the second outer electrode, the body includes a multilayer unit including an effective portion defined by the first and second effective portions and portions of the ceramic dielectric layers stacked therebetween, the body is sectioned in the thickness direction into a thickness-direction first outer layer section that includes one of the ceramic dielectric layers including the first principal surface, a thickness-direction second outer layer section that includes one of the ceramic dielectric layers including the second principal surface, and a thickness-direction inner layer section that includes the multilayer unit and that is disposed between the thickness-direction first and second outer layer sections, the body is sectioned in the length direction into a length-direction first outer layer section that includes the first extension portions and portions of the ceramic dielectric layers sandwiched by the first extension portions and that defines the first end surface, a length-direction second outer layer section that includes the second extension portions and portions of the ceramic dielectric layers sandwiched by the second extension portions and that defines the second end surface, and a length-direction inner layer section that includes the multilayer unit and that is disposed between the length-direction first and second outer layer sections, the body is sectioned in the width direction into a width-direction first outer layer section that includes a portion between the first side surface and the multilayer unit, a width-direction second outer layer section that includes a portion between the second side surface and the multilayer unit, and a width-direction inner layer section that includes the multilayer unit and that is disposed between the width-direction first and second outer layer sections, a dimension of the thickness-direction second outer layer section in the thickness direction is greater than a dimension of the thickness-direction first outer layer section in the thickness direction, the ceramic dielectric layers included in the thickness-direction inner layer section and the thickness-direction first and second outer layer sections contains barium titanate and Si, the thickness-direction second outer layer section includes an outer portion which includes the second principal surface and an inner portion disposed between the thickness-direction inner layer section and the outer portion, a composition ratio of Si to Ti in one of the ceramic dielectric layers included in the outer portion is higher than a composition ratio of Si to Ti in one of the ceramic dielectric layers included in the inner portion, a boundary portion between the outer portion and the inner portion has a larger Si content than the outer portion, the inner portion has a higher composition ratio of Mn to Ti than the outer portion, each of minimum dimensions in the length direction of the length-direction first and second outer layer sections is greater than both minimum dimensions in the width direction of the width-direction first and second outer layer sections, one of the first and second extension portions of a first outermost conductive layer of the conductive layers that is closest to the first principal surface is inclined toward the second principal surface, one of the first and second extension portions of a second outermost conductive layer of the conductive layers that is closest to the second principal surface is inclined toward the first principal surface, and an amount of inclination of the second outermost conductive layer is greater than an amount of inclination of the first outermost conductive layer.

In the above-described multilayer ceramic capacitor according to a preferred embodiment of the present invention, it is preferable that a difference between the amount of inclination of the second outermost conductive layer and the amount of inclination of the first outermost conductive layer is greater than a thickness of the dielectric layer stacked between the conductive layers.

In the above-described multilayer ceramic capacitor according to a preferred embodiment of the present invention, it is preferable that the ceramic dielectric layers included in the multilayer unit have a higher composition ratio of rare earth element to Ti than the outer portion.

In the above-described multilayer ceramic capacitor according to a preferred embodiment of the present invention, it is preferable that the ceramic dielectric layers included in the multilayer unit have a higher composition ratio of Dy to Ti than the outer portion.

In the above-described multilayer ceramic capacitor according to a preferred embodiment of the present invention, it is preferable that a dimension of the outer portion in the thickness direction is greater than a dimension of the inner portion in the thickness direction According to various preferred embodiments of the present invention, it is possible to provide a multilayer ceramic capacitor in which it is possible to significantly reduce or prevent the occurrence of cracks caused by an internal stress produced by the difference in the coefficient of thermal shrinkage between a ceramic dielectric layer and a conductive layer, and to provide a multilayer ceramic capacitor array including this multilayer ceramic capacitor and a multilayer ceramic capacitor mount body including this multilayer ceramic capacitor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 an exploded perspective view illustrating a multilayer structure of a set of base sheets, which define a body of the multilayer ceramic capacitor shown in FIG. 1.

FIG. 18 is a table illustrating design conditions and evaluation results for multilayer ceramic capacitors of examples 1 through 7 in a first verification test.

FIG. 19 is a table illustrating design conditions and evaluation results for multilayer ceramic capacitors of examples 8 through 14 in a second verification test.

FIG. 20 is a table illustrating design conditions and evaluation results for multilayer ceramic capacitors of examples 15 through 35 in a third verification test.

FIG. 21 is a table illustrating design conditions and evaluation results for multilayer ceramic capacitors of examples 36 through 39 in a fourth verification test.

DETAILED DESCRIPTION OF THE PREFERRED EMBODIMENTS

Figure 1:
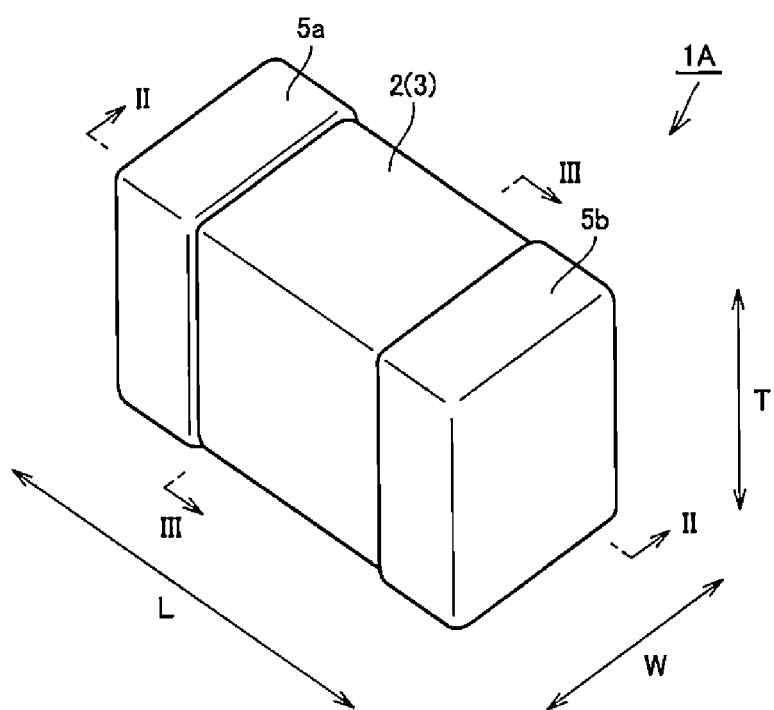
FIG. 1 is a schematic perspective view illustrating a multilayer ceramic capacitor according to a first preferred embodiment of the present invention.

Preferred embodiments of the present invention will be described below in detail with reference to the accompanying drawings. In the following preferred embodiments, the same or similar components are designated by like reference numerals, and components designated by like reference numerals will be explained only once.

First Preferred Embodiment

Figure 2:
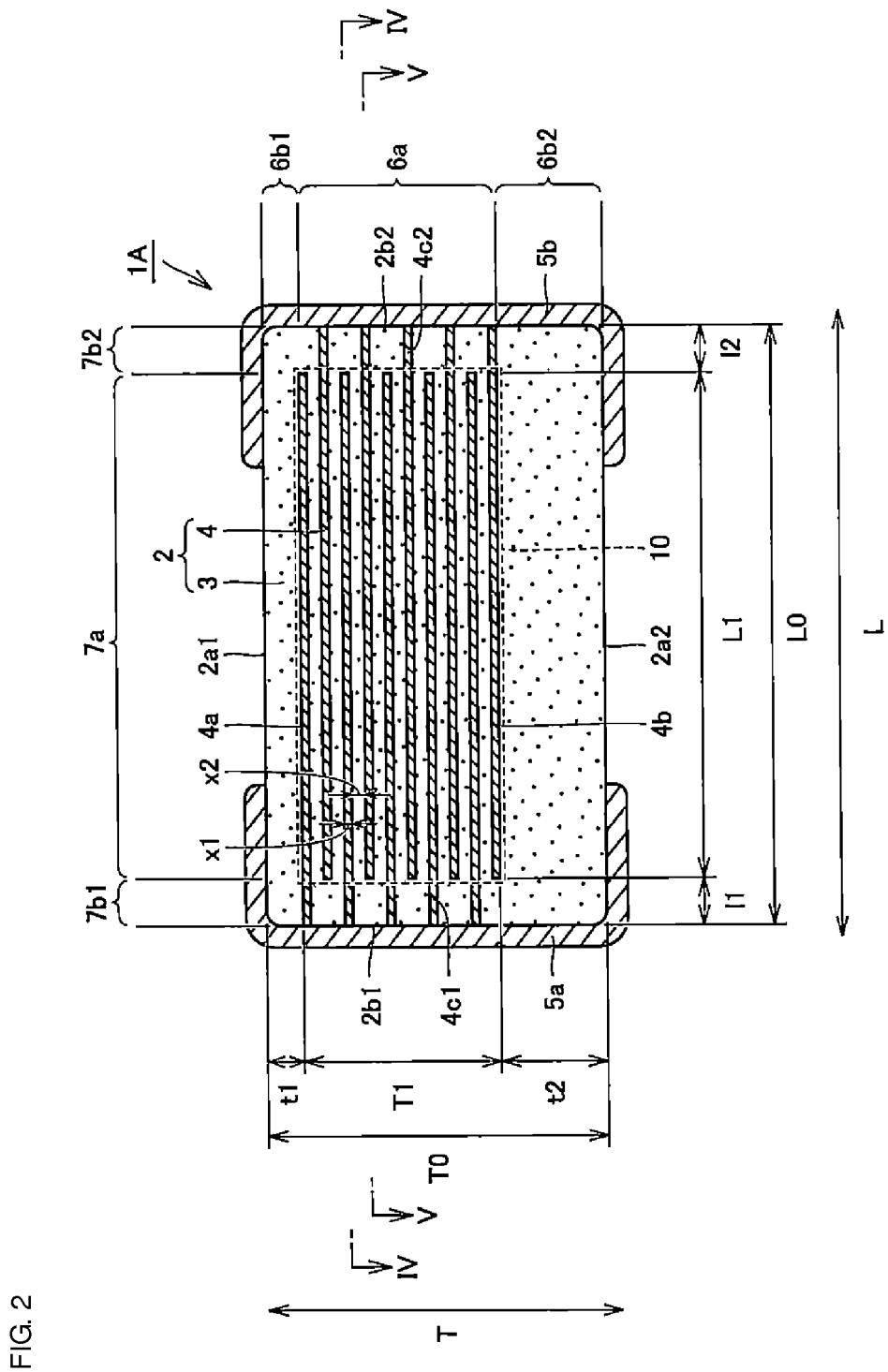
FIGS. 2 and 3 are schematic sectional views taken along lines II-II and III-III, respectively, of FIG. 1.
Figure 3:
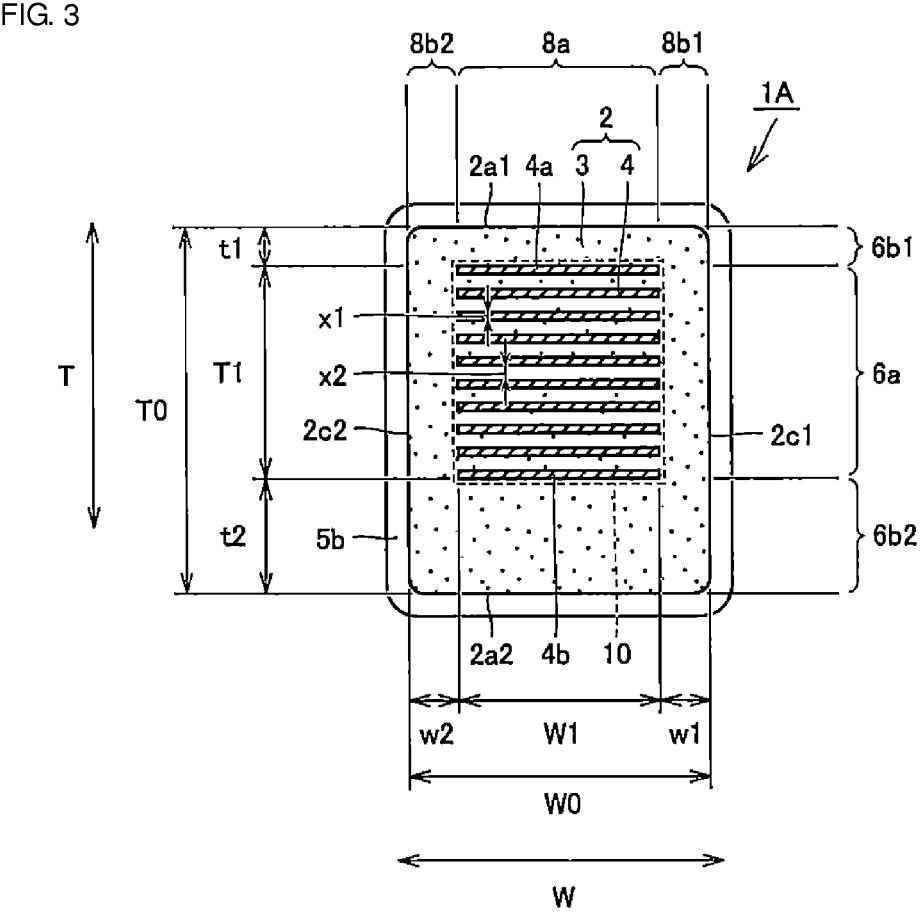
Figure 4:
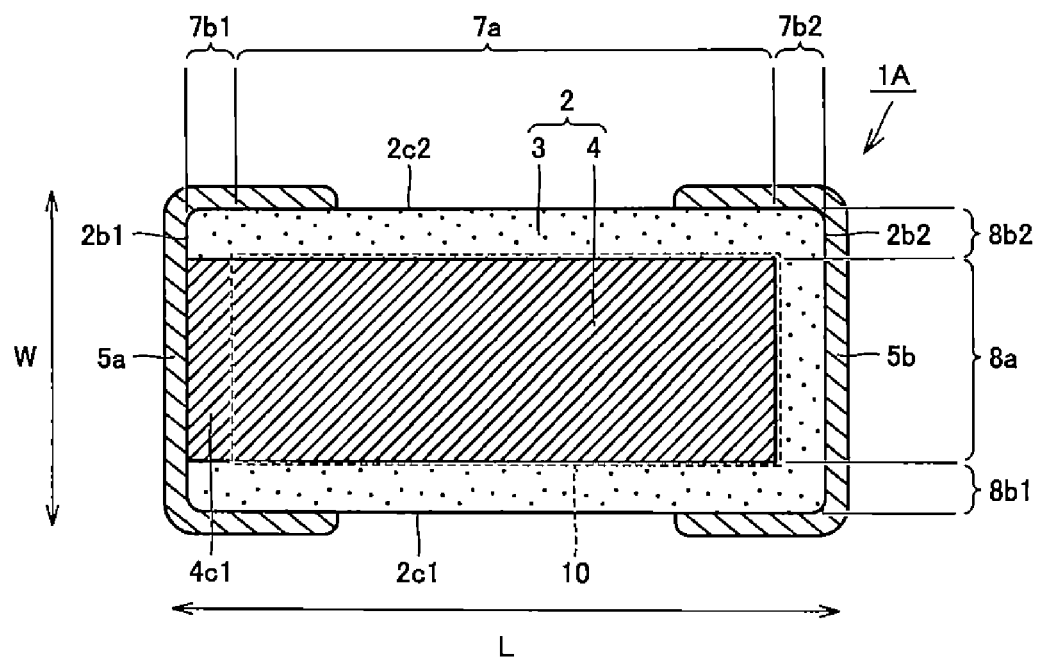
FIGS. 4 and 5 are schematic sectional views taken along lines IV-IV and V-V, respectively, of FIG. 2.
Figure 5:
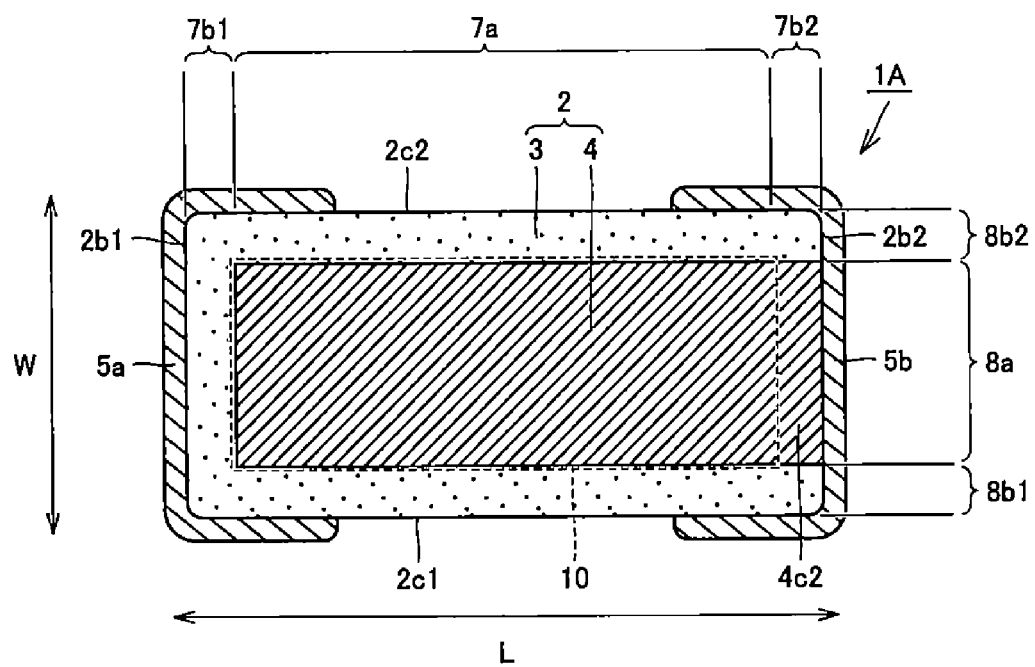

FIG. 1 is a schematic perspective view illustrating a multilayer ceramic capacitor 1A according to a first preferred embodiment of the present invention. FIGS. 2 and 3 are schematic sectional views taken along lines II-II and III-III, respectively, of FIG. 1. FIGS. 4 and 5 are schematic sectional views taken along lines IV-IV and V-V, respectively, of FIG. 2. The configuration of the multilayer ceramic capacitor 1A of the first preferred embodiment will first be described below with reference to FIGS. 1 through 5.

As shown in FIGS. 1 through 5, the multilayer ceramic capacitor 1A is an electronic component preferably having a rectangular or substantially rectangular parallelepiped shape and including a body 2 and first and second outer electrodes 5a and 5b, which define a pair of outer electrodes.

As shown in FIGS. 2 through 5, the body 2 preferably has a rectangular or substantially rectangular parallelepiped shape and includes ceramic dielectric layers 3 and inner electrode layers 4 alternately stacked on each other in a predetermined direction. The inner electrode layers 4 define and serve as conductive layers. The term "rectangular parallelepiped" includes a rectangular parallelepiped having a rounded portion at a corner or a ridge of the body 2 and a rectangular parallelepiped having a step portion or uneven portion, which is negligible as a whole, on the surface of the body 2.

The ceramic dielectric layers 3 contain a perovskite compound expressed by $ABO_3$ ("A" contains Ba and "B" contains Ti) as a principal component. A typical example of a perovskite compound expressed by $ABO_3$ is barium titanate ($BaTiO_3$).

The ceramic dielectric layers 3 contain Si as a secondary component. Si is contained in the ceramic dielectric layers 3 by adding a Si compound, such as glass or $SiO_2$, to a perovskite compound expressed by $ABO_3$. Another compound, such as a Mn compound, an Mg compound, a Co compound, a Ni compound, or a rare earth compound, may be added to a perovskite compound expressed by $ABO_3$.

In the first preferred embodiment, the principal component of the ceramic dielectric material for the ceramic dielectric layers 3 is not restricted to a perovskite compound expressed by $ABO_3$ ("A" contains Ba and "B" contains Ti). Another ceramic dielectric material having a high dielectric constant containing, for example, calcium titanate, strontium titanate, or calcium zirconate as a principal component, may be used.

As a material for the inner electrode layers 4, a metal, such as Ni, Cu, Ag, Pd, or Au, or an alloy containing at least one of such metals (for example, an alloy of Ag and Pd) may be used, for example. The thickness of each inner electrode layer 4 after the body 2 has been fired is preferably about 0.3 µm to about 2 µm, for example.

The body 2 is preferably fabricated in the following manner. A plurality of material sheets, that is, a plurality of ceramic green sheets, which will form the ceramic dielectric layers 3, on which conductor patterns, which will form the inner electrode layers 4, are printed, are first prepared. These material sheets are stacked on and pressed against each other so as to form a mother block. Then, the mother block is cut into a plurality of chips, and they are fired. Each of the plurality of chips serves as the body 2. Details of this fabrication process will be discussed later.

As shown in FIGS. 1 through 5, the first and second outer electrodes 5a and 5b are disposed separately from each other such that they cover outer surfaces of the body 2 which are positioned at both end portions thereof in a predetermined direction. The first and second outer electrodes 5a and 5b each include a conductive film.

The first and second outer electrodes 5a and 5b each include a foundation layer which covers the above-described end portions of the body 2 and a plated layer which covers the foundation layer. As a material for the foundation layer, a metal, such as Ni, Cu, Ag, Pd, or Au, or an alloy containing at least one of such metals (for example, an alloy of Ag and Pd) may be used, for example. The thickness of the foundation layer is preferably about 10 µm to about 50 µm, for example.

The foundation layer may be formed by burning a conductor paste applied to the above-described end portions of the body 2 which has been fired. Alternatively, the foundation layer may be formed by firing, together with the inner electrode layers 4, a conductor paste applied to the above-described end portions of the body 2 which has not been fired. Alternatively, the foundation layer may be formed by plating the above-described end portions of the body 2 or by curing a thermosetting resin containing a metal applied to the end portions of the body 2.

If the foundation layer contains a resin, it is possible to reduce a load on the body 2 caused by an external stress which is produced when a mounting member (for example, a wiring board 101, which will be discussed later) having the multilayer ceramic capacitor 1A mounted thereon is deflected due to an external force. This makes it possible to reduce the occurrence of cracks in the body 2.

As a material for the plated layer, a metal, such as Ni, Sn, Cu, Ag, Pd, or Au, or an alloy containing at least one of such metals (for example, an alloy of Ag and Pd) may be used, for example.

The plated layer may be constituted by a plurality of layers, for example. In this case, the plated layer is preferably a two-layer structure in which a Sn plated layer is provided on a Ni plated layer. In this case, the Ni plated layer functions as a solder barrier layer, while the Sn plated layer improves solder wettability. The thickness of one plated layer is preferably about 1.0 μm to about 10 μm, for example.

As shown in FIGS. 2, 4, and 5, if it is assumed that two inner electrode layers 4 adjacent to each other with a ceramic dielectric layer 3 therebetween in the stacking direction define a pair, one inner electrode layer 4 is connected to the first outer electrode 5a via a first extension portion 4c1 within the multilayer ceramic capacitor 1A, while the other inner electrode layer 4 is connected to the second outer electrode 5b via a second extension portion 4c2 within the multilayer ceramic capacitor 1A. The plurality of inner electrode layers 4 preferably are all rectangular or substantially rectangular, as viewed from above.

In the multilayer ceramic capacitor 1A of the first preferred embodiment configured as described above, a plurality of capacitor elements are electrically connected in parallel between the first and second outer electrodes 5a and 5b. The first extension portion 4c1 is a portion positioned between an effective portion of the inner electrode layers 4 (that is, an area where a plurality of inner electrode layers 4 are stacked in the stacking direction) and the first outer electrode 5a, while the second extension portion 4c2 is a portion positioned between the effective portion of the inner electrode layers 4 and the second outer electrode 5b. The effective portion of the inner electrode layers 4 will be discussed later.

In the first preferred embodiment, preferably all the conductive layers, that is, all the inner electrode layers 4, inside the body 2 are connected to one of the first and second outer electrodes 5a and 5b. However, the multilayer ceramic capacitor 1A may be configured in a different manner as long as at least some of the plurality of conductive layers are connected to the first outer electrode 5a and at least some of the remaining conductive layers are connected to the second outer electrode 5b. That is, there may be some conductive layers that are neither connected to the first outer electrode 5a nor the second outer electrode 5b.

As shown in FIGS. 2 and 3, in the multilayer ceramic capacitor 1A of the first preferred embodiment, the inner electrode layers 4 other than those defining the first and second extension portions 4c1 and 4c2 define the effective portion that determines the electrostatic capacitance of the multilayer ceramic capacitor 1A. The effective portion of the inner electrode layers 4 and the ceramic dielectric layers 3 positioned between the inner electrode layers 4 defines a multilayer unit 10. The multilayer unit 10 is formed preferably by densely stacking the ceramic dielectric layers 3 and the inner electrode layers 4 in the thickness direction, for example.

By referring to FIGS. 1 through 5, as the orientations of the multilayer ceramic capacitor 1A, the stacking direction of the ceramic dielectric layers 3 and the inner electrode layers 4 will be defined as a thickness direction T, the direction in which the first and second outer electrodes 5a and 5b are arranged side by side perpendicular to the thickness direction T is defined as a length direction L, and the direction perpendicular to both of the thickness direction T and the length direction L is defined as a width direction W. In the following description, these terms will be used.

By referring to FIGS. 2 through 5, among six outer surfaces of the body 2, a pair of outer surfaces opposing each other in the thickness direction T will be defined as first and second principal surfaces 2a1 and 2a2, a pair of outer surfaces opposing each other in the length direction L will be defined as first and second end surfaces 2b1 and 2b2, and a pair of outer surfaces opposing each other in the width direction W will be defined as first and second side surfaces 2c1 and 2c2. In the following description, these terms will be used.

As shown in FIGS. 1 through 5, the first and second outer electrodes 5a and 5b are disposed such that they cover outer surfaces of the body 2 which are positioned in the length direction L. More specifically, the first outer electrode 5a is disposed such that it covers the first end surface 2b1 and also covers portions of the first and second principal surfaces 2a1 and 2a2 and the first and second side surfaces 2c1 and 2c2 positioned closer to the first end surface 2b1, while the second outer electrode 5b is disposed such that it covers the second end surface 2b2 and also covers portions of the first and second principal surfaces 2a1 and 2a2 and the first and second side surfaces 2c1 and 2c2 positioned closer to the second end surface 2b2.

As shown in FIGS. 2 and 3, the body 2 is sectioned in the thickness direction T into a thickness-direction inner layer section 6a and thickness-direction first and second outer layer sections 6b1 and 6b2.

The thickness-direction inner layer section 6a includes the multilayer unit 10 and is constituted by the inner electrode layers 4 and ceramic dielectric layers 3. The inner electrode layers 4 defining the thickness-direction inner layer section 6a include the inner electrode layers 4 contained in the multilayer unit 10, the inner electrode layers 4 defining the first extension portion 4c1 which extends from some of the inner electrode layers 4 contained in the multilayer unit 10 toward the first end surface 2b1 so as to be connected to the first outer electrode 5a, and the inner electrode layers 4 defining the second extension portion 4c2 which extends from the remaining inner electrode layers 4 contained in the multilayer unit 10 toward the second end surface 2b2 so as to be connected to the second outer electrode 5b.

The thickness-direction first outer layer section 6b1 is constituted by a ceramic dielectric layer 3 and does not include any inner electrode layer 4. The thickness-direction first outer layer section 6b1 covers the surface of the thickness-direction inner layer section 6a closer to the first principal surface 2a1 so as to define the first principal surface 2a1 of the body 2.

The thickness-direction second outer layer section 6b2 is constituted by a ceramic dielectric layer 3 and does not include any inner electrode layer 4. The thickness-direction second outer layer section 6b2 covers the surface of the thickness-direction inner layer section 6a closer to the second principal surface 2a2 so as to define the second principal surface 2a2 of the body 2.

With this configuration, the thickness-direction inner layer section 6a is sandwiched between the thickness-direction first and second outer layer sections 6b1 and 6b2 in the thickness direction T. Among the inner electrode layers 4 contained in the thickness-direction inner layer section 6a, the first conductive layer 4a disposed closest to the first principal surface 2a1 is disposed adjacent to the ceramic dielectric layer 3 defining the thickness-direction first outer layer section 6b1. Among the inner electrode layers 4 contained in the thickness-direction inner layer section 6a, the second conductive layer 4b disposed closest to the second principal surface 2a2 is disposed adjacent to the ceramic dielectric layer 3 defining the thickness-direction second outer layer section 6b2.

As shown in FIGS. 2, 4, and 5, the body 2 is sectioned in the length direction L into a length-direction inner layer section 7a and length-direction first and second outer layer sections 7b1 and 7b2.

The length-direction inner layer section 7a includes the multilayer unit 10 and is constituted by the inner electrode layers 4 and ceramic dielectric layers 3. The inner electrode layers 4 defining the length-direction inner layer section 7a are constituted only by the inner electrode layers 4 contained in the multilayer unit 10.

The length-direction first outer layer section 7b1 is constituted by the inner electrode layers 4 defining the first extension portion 4c1 and portions of the ceramic dielectric layers 3. The length-direction first outer layer section 7b1 covers the surface of the length-direction inner layer section 7a closer to the first end surface 2b1 so as to define the first end surface 2b1 of the body 2.

The length-direction second outer layer section 7b2 is constituted by the inner electrode layers 4 defining the second extension portion 4c2 and portions of the ceramic dielectric layers 3. The length-direction second outer layer section 7b2 covers the surface of the length-direction inner layer section 7a closer to the second end surface 2b2 so as to define the second end surface 2b2 of the body 2.

With this configuration, the length-direction inner layer section 7a is sandwiched between the length-direction first and second outer layer sections 7b1 and 7b2 in the length direction L.

As shown in FIGS. 3 through 5, the body 2 is sectioned in the width direction W into a width-direction inner layer section 8a and width-direction first and second outer layer sections 8b1 and 8b2.

The width-direction inner layer section 8a includes the multilayer unit 10 and is constituted by the inner electrode layers 4 and ceramic dielectric layers 3. The inner electrode layers 4 defining the width-direction inner layer section 8a include the inner electrode layers 4 contained in the multilayer unit 10 and the inner electrode layers 4 defining the first and second extension portions 4c1 and 4c2.

The width-direction first outer layer section 8b1 is constituted by a ceramic dielectric layer 3 and does not include any inner electrode layer 4. The width-direction first outer layer section 8b1 covers the surface of the width-direction inner layer section 8a closer to the first side surface 2c1 so as to define the first side surface 2c1 of the body 2.

The width-direction second outer layer section 8b2 is constituted by a ceramic dielectric layer 3 and does not include any inner electrode layer 4. The width-direction second outer layer section 8b2 covers the surface of the width-direction inner layer section 8a closer to the second side surface 2c2 so as to define the second side surface 2c2 of the body 2.

With this configuration, the width-direction inner layer section 8a is sandwiched between the width-direction first and second outer layer sections 8b1 and 8b2 in the width direction W.

In this manner, in the multilayer ceramic capacitor 1A of the first preferred embodiment, the multilayer unit 10 formed preferably by alternately and densely stacking the plurality of inner electrode layers 4 and the plurality of ceramic dielectric layers 3 is contained in the body 2. Outer layer sections constituted by ceramic dielectric layers 3 (that is, the thickness-direction first and second outer layer sections 6b1 and 6b2 and the width-direction first and second outer layer sections 8b1 and 8b2) and outer layer sections constituted by portions of ceramic dielectric layers 3 and portions of a relatively small number of inner electrode layers 4 which are disposed between the ceramic dielectric layers 3 (that is, the length-direction first and second outer layer sections 7b1 and 7b2) are disposed such that they cover the multilayer unit 10. With this arrangement, the body 2 is provided.

As shown in FIG. 3, in the multilayer ceramic capacitor 1A of the first preferred embodiment, a dimension T1 of the multilayer unit 10 in the thickness direction T is preferably greater than a dimension W1 of the multilayer unit 10 in the width direction W (T1>W1). With this configuration, it is possible to provide a large multilayer unit 10 without increasing the dimension W1 in the width direction W. This makes it possible to increase the number of ceramic dielectric layers 3 and inner electrode layers 4 to be stacked in the thickness direction T. Thus, without increasing the size of the multilayer ceramic capacitor 1A in the width direction W (in other words, without increasing the area required for mounting the multilayer ceramic capacitor 1A), the electrostatic capacitance of the multilayer ceramic capacitor 1A is increased.

As shown in FIG. 2, in the multilayer ceramic capacitor 1A of the first preferred embodiment, a dimension L1 of the multilayer unit 10 in the length direction L is preferably greater than the dimension T1 of the multilayer unit 10 in the thickness direction T (L1>T1). The reason for this is as follows. It is necessary to separate the first and second outer electrodes 5a and 5b from each other by a considerable distance in the length direction L to secure insulation characteristics therebetween, which inevitably increases the dimension L1 of the multilayer unit 10 in the length direction L. Even if the number of ceramic dielectric layers 3 and inner electrode layers 4 is decreased in the thickness direction T for the sake of the increased dimension L of the multilayer unit 10 in the length direction L, a considerable amount of electrostatic capacitance is secured.

As shown in FIGS. 2 and 3, in the multilayer ceramic capacitor 1A of the first preferred embodiment, a dimension T0 of the body 2 in the thickness direction T is preferably greater than a dimension W0 of the body 2 in the width direction W (T0>W0), and also, a dimension L0 of the body 2 in the length direction L is preferably greater than the dimension T0 of the body 2 in the thickness direction T (L0>T0). The reason for setting the relationships among the dimensions of the body 2 in this manner is to reduce the size of the multilayer ceramic capacitor 1A to a minimal level to implement high-density mounting. A largest possible size of the multilayer unit 10 is first secured, and then, it is necessary to minimize the sizes of various outer layer sections (that is, the above-described thickness-direction first and second outer layer sections 6b1 and 6b2, length-direction first and second outer layer sections 7b1 and 7b2, and width-direction first and second outer layer sections 8b1 and 8b2). To implement this, the relationships among the outer dimensions of the body 2 are preferably the same as those of the multilayer unit 10.

As shown in FIGS. 2 and 3, a dimension t2 of the thickness-direction second outer layer section 6b2 in the thickness direction T is greater than a dimension t1 of the thickness-direction first outer layer section 6b1 in the thickness direction T (t2>t1). With this configuration, the multilayer ceramic capacitor 1A can be mounted on a mounting member, such as a wiring board, such that the second principal surface 2a2 defined by the thickness-direction second outer layer section 6b2 faces the mounting member. Thus, even if the mounting member is deflected due to an external force, it is possible to significantly reduce or prevent the occurrence of cracks caused by an external stress applied to the multilayer ceramic capacitor 1A.

As discussed above, generally, in a multilayer ceramic capacitor, a crack may be produced in a ceramic dielectric layer because an internal stress produced by the difference in the coefficients of thermal shrinkage between ceramic dielectric layers and conductive layers acts as a shear stress on the ceramic dielectric layer.

Concerning the width direction, this type of crack is likely to be produced mostly at a boundary between a width-direction inner layer section and a width-direction first or second outer layer section, in which case, a crack is produced in an area starting from a widthwise end portion of the multilayer unit to the surface of the body near this widthwise end portion.

Concerning the length direction, this type of crack is likely to be produced mostly at a boundary between a length-direction inner layer section and a length-direction first or second outer layer section, in which case, a crack is produced in an area starting from a longitudinal end portion of the multilayer unit to the surface of the body near this longitudinal end portion. Concerning the length direction, in particular, this type of crack is also likely to be produced at a boundary between an extension portion of a conductive layer contained in the length-direction first or second outer layer section and a ceramic dielectric layer adjacent to this extension portion. This crack is also referred to as "interlayer delamination".

These cracks are produced particularly when the dimension $t2$ of the thickness-direction second outer layer section $6b2$ in the thickness direction T is greater than the dimension $t1$ of the thickness-direction first outer layer section $6b1$ in the thickness direction T, as in the case of the first preferred embodiment of the present invention.

As a result of conducting an extensive study, the present inventors have discovered that the occurrence of such a crack caused by an internal stress produced by the difference in the coefficients of thermal shrinkage between ceramic dielectric layers and conductive layers is capable of being significantly reduced or prevented by increasing an adhesion force of a ceramic dielectric material in the width-direction first and second outer layer sections and that in the length-direction first and second outer layer sections and/or by increasing an adhesion force between the ceramic dielectric material and a conductor material in the length-direction first and second outer layer sections. Then, the present inventors have discovered that, in order to implement this, in a step of pressing a set of material sheets (S5) in a manufacturing flow (see FIG. 6) of multilayer ceramic capacitors in the first preferred embodiment, the application of a sufficient pressure force to portions which will define the width-direction first and second outer layer sections $8b1$ and $8b2$ and the length-direction first and second outer layer sections $7b1$ and $7b2$ is effective.

As a result, the present inventors have discovered that, in a manufactured multilayer ceramic capacitor, if certain ones of the following conditions are satisfied, the occurrence of cracks caused by an internal stress is effectively reduced or prevented and the reliability of multilayer ceramic capacitors as products and the yield in a manufacturing process is greatly improved. These conditions have been established on the basis of evaluation results of first and second verification tests, which will be discussed below.

As shown in FIG. 3, both of dimensions $w1$ and $w2$ of the width-direction first and second outer layer sections $8b1$ and $8b2$, respectively, in the width direction W are preferably greater than the dimension $t1$ of the thickness-direction first outer layer section $6b1$ in the thickness direction T ($w1>t1$ and $w2>t1$). With this configuration, the adhesion force of the ceramic dielectric material in the width-direction first and second outer layer sections $8b1$ and $8b2$ significantly increases, thus effectively significantly reducing or preventing the occurrence of cracks caused by an internal stress in these sections.

More preferably, both of the dimensions $w1$ and $w2$ of the width-direction first and second outer layer sections $8b1$ and $8b2$, respectively, in the width direction W are more than about 1.3 times as large as the dimension $t1$ of the thickness-direction first outer layer section $6b1$ in the thickness direction T ($w1/t1>1.3$ and $w2/t1>1.3$), for example. With this configuration, it is possible to more reliably reduce or prevent the occurrence of cracks caused by an internal stress in the width-direction first and second outer layer sections $8b1$ and $8b2$.

If the dimension $T1$ of the multilayer unit 10 in the thickness direction T is about 1.15 times or more as large as the dimension $W1$ of the multilayer unit 10 in the width direction W ($T1/W1 \geq 1.15$), both of the dimensions $w1$ and $w2$ of the width-direction first and second outer layer sections $8b1$ and $8b2$, respectively, in the width direction W are preferably more than about 1.5 times as large as the dimension $t1$ of the thickness-direction first outer layer section $6b1$ in the thickness direction T ($w1/t1>1.5$ and $w2/t1>1.5$). With this configuration, even in the case of $T1/W1 \geq 1.15$, it is also possible to more reliably reduce or prevent the occurrence of cracks caused by an internal stress in the width-direction first and second outer layer sections $8b1$ and $8b2$, and in particular, even under the operating environments in which thermal shock is repeatedly applied, high reliability is secured.

As shown in FIG. 2, both of dimensions $l1$ and $l2$ of the length-direction first and second outer layer sections $7b1$ and $7b2$, respectively, in the length direction L are preferably greater than the dimension $t1$ of the thickness-direction first outer layer section $6b1$ in the thickness direction T ($l1>t1$ and $l2>t1$). With this configuration, the adhesion force of the ceramic dielectric material and the adhesion force between the ceramic dielectric material and the conductor material in the length-direction first and second outer layer sections $7b1$ and $7b2$ significantly increases, thus effectively reducing or preventing the occurrence of cracks caused by an internal stress in these sections.

More preferably, both of the dimensions $l1$ and $l2$ of the length-direction first and second outer layer sections $7b1$ and $7b2$, respectively, in the length direction L are more than about 1.5 times as large as the dimension $t1$ of the thickness-direction first outer layer section $6b1$ in the thickness direction T ($l1/t1>1.5$ and $l2/t1>1.5$). With this configuration, it is possible to more reliably reduce or prevent the occurrence of cracks caused by an internal stress in the length-direction first and second outer layer sections $7b1$ and $7b2$.

If the dimension $T1$ of the multilayer unit 10 in the thickness direction T is about 0.67 times or more as large as the dimension $L1$ of the multilayer unit 10 in the length direction L ($T1/L1 \geq 0.67$), both of the dimensions $l1$ and $l2$ of the length-direction first and second outer layer sections $7b1$ and $7b2$, respectively, in the length direction L are preferably more than about twice as large as the dimension $t1$ of the thickness-direction first outer layer section $6b1$ in the thickness direction T ($l1/t1>2$ and $l2/t1>2$). With this configuration, even in the case of $T1/L1 \geq 0.67$, it is also possible to more reliably reduce or prevent the occurrence of cracks caused by an internal stress in the length-direction first and second outer layer sections $7b1$ and $7b2$, and in particular, even under the operating environments in which thermal shock is repeatedly applied, high reliability is secured.

In FIGS. 2 and 3, the dimension t1 of the thickness-direction first outer layer section 6b1 in the thickness direction T is preferably about 40 μm or smaller, for example. If the dimension t1 is large, the difference in the coefficients of thermal shrinkage between the thickness-direction inner layer section 6a including the multilayer unit 10 and the thickness-direction first outer layer section 6b1 without the multilayer unit 10 becomes more noticeable. This may significantly increase a shear stress caused by the difference in the coefficients of thermal shrinkage, thus increasing the possibility that cracks will occur at the boundary between the thickness-direction inner layer section 6a and the thickness-direction first outer layer section 6b1. With the dimension t1 having a thickness of about 40 μm or smaller, for example, the difference in the coefficients of thermal shrinkage is significantly reduced or minimized, thereby effectively reducing or preventing the occurrence of cracks at this boundary.

As stated above, the dimension t2 of the thickness-direction second outer layer section 6b2 in the thickness direction T preferably is greater than the dimension t1 of the thickness-direction first outer layer section 6b1 in the thickness direction T. While considering a tradeoff relationship in which by increasing the dimension t2, the occurrence of cracks due to an external stress is significantly reduced or prevented, but on the other hand, the occurrence of cracks due to an internal stress is increased, the dimension t2 is reduced to be as small as possible, thus significantly reducing or preventing the occurrence of cracks at the boundary between the thickness-direction inner layer section 6a including the multilayer unit 10 and the thickness-direction second outer layer section 6b2 without the multilayer unit 10.

In FIG. 3, both of the dimensions w1 and w2 of the width-direction first and second outer layer sections 8b1 and 8b2 in the width direction W are preferably about 52 μm or greater, for example. With this configuration, the adhesion force of the ceramic dielectric material in the width-direction first and second outer layer sections 8b1 and 8b2 significantly increases, thus effectively significantly reducing or preventing the occurrence of cracks due to an internal stress in these sections.

In FIG. 2, both of the dimensions l1 and l2 of the length-direction first and second outer layer sections 7b1 and 7b2 in the length direction L are preferably about 60 μm or greater, for example. With this configuration, the adhesion force of the ceramic dielectric material and the adhesion force between the ceramic dielectric material and the conductor material in the length-direction first and second outer layer sections 7b1 and 7b2 significantly increase, thus effectively reducing or preventing the occurrence of cracks due to an internal stress in these sections.

In FIG. 3, the dimension W0 of the body 2 in the width direction W, the dimension T1 of the multilayer unit 10 in the thickness direction T, and the dimension W1 of the multilayer unit 10 in the width direction W preferably satisfy the relationship expressed by $T1/(W0-W1) \leq 6.95$. With this configuration, the adhesion force of the ceramic dielectric material in the width-direction first and second outer layer sections 8b1 and 8b2 is greatly increased, thus effectively reducing or preventing the occurrence of cracks due to an internal stress in these sections.

The value expressed by $W0-W1$ is equal to the total width of the dimension w1 of the width-direction first outer layer section 8b1 and the dimension w2 of the width-direction second outer layer section 8b2 (that is, $W0-W1=w1+w2$). The value expressed by $T1/(W0-W1)$ serves as a reference, after a step of stacking material sheets (S4) in the manufacturing flow (see FIG. 6) of multilayer ceramic capacitors in the first preferred embodiment, for the aspect ratio between the dimension in the thickness direction T and the dimension in the width direction W of portions which will define the multilayer units 10 of individual multilayer ceramic capacitors positioned adjacent to each other in the width direction W.

If the above-described relationship expressed by $T1/(W0-W1) \leq 6.95$ is satisfied, it indicates that in a step of pressing a set of material sheets (S5) in the manufacturing flow (see FIG. 6) of multilayer ceramic capacitors in the first preferred embodiment, a sufficient pressure force has been applied to portions which will form the width-direction first and second outer layer sections 8b1 and 8b2. As a result, the occurrence of cracks in the width-direction first and second outer layer sections 8b1 and 8b2 caused by an internal stress are effectively reduced or prevented.

In FIG. 2, the dimension L0 of the body 2 in the length direction L, the dimension T1 of the multilayer unit 10 in the thickness direction T, and the dimension L1 of the multilayer unit 10 in the length direction L preferably satisfy the relationship expressed by $T1/(L0-L1) \leq 5.98$. With this configuration, the adhesion force of the ceramic dielectric material and the adhesion force between the ceramic dielectric material and the conductor material in the length-direction first and second outer layer sections 7b1 and 7b2 are sufficiently increased, thus effectively reducing or preventing the occurrence of cracks due to an internal stress in these sections.

The value expressed by $L0-L1$ is equal to the total length of the dimension l1 of the length-direction first outer layer section 7b1 and the dimension l2 of the length-direction second outer layer section 7b2 (that is, $L0-L1=l1+l2$). The value expressed by $T1/(L0-L1)$ serves as a reference, after the step of stacking material sheets (S4) in the manufacturing flow (see FIG. 6) of multilayer ceramic capacitors in the first preferred embodiment, for the aspect ratio between the dimension in the thickness direction T and the dimension in the length direction L of portions which will define multilayer units 10 of individual multilayer ceramic capacitors positioned adjacent to each other in the length direction L.

If the above-described relationship expressed by $T1/(L0-L1) \leq 5.98$ is satisfied, it indicates that in the step of pressing a set of material sheets (S5) in the manufacturing flow (see FIG. 6) of multilayer ceramic capacitors in the first preferred embodiment, a sufficient pressure force has been applied to portions which will define the length-direction first and second outer layer sections 7b1 and 7b2. As a result, the occurrence of cracks in the length-direction first and second outer layer sections 7b1 and 7b2 caused by an internal stress are effectively reduced or prevented.

In FIGS. 2 and 3, the thickness x1 of each of the plurality of inner electrode layers 4 contained in the multilayer unit 10 is preferably about 0.8 times or less as large as the thickness x2 of each of the plurality of ceramic dielectric layers 3 contained in the multilayer unit 10 ($x1/x2 \leq 0.8$), for example.

With this configuration, after the step of stacking material sheets (S4) in the manufacturing flow (see FIG. 6) of multilayer ceramic capacitors in the first preferred embodiment, the difference between the total thickness of ceramic bases 12 and conductor patterns 13 which will define the multilayer unit 10 and the total thickness of ceramic bases 12 which will define the length-direction first and second outer layer sections 7b1 and 7b2 and the width-direction first and second outer layer sections 8b1 and 8b2 and conductor patterns 13 which will define the length-direction first and second outer layer sections 7b1 and 7b2 is reduced (see FIGS. 8A through 9B).

Thus, in the step of fixing a set of material sheets with pressure (S5) in the manufacturing flow (see FIG. 6), a sufficient pressure force is applied to portions which will define the length-direction first and second outer layer sections 7b1 and 7b2 and the width-direction first and second outer layer sections 8b1 and 8b2. As a result, the occurrence of cracks in these portions caused by an internal stress is effectively significantly reduced or prevented.

In FIGS. 2 and 3, each of the dimensions l1 and l2 of the length-direction first and second outer layer sections 7b1 and 7b2, respectively, in the length direction L is preferably greater than the dimensions w1 and w2 of the width-direction first and second outer layer sections 8b1 and 8b2, respectively, in the width direction W (l1>w1, l1>w2, l2>w1, l2>w2).

As stated above, the length-direction first and second outer layer sections 7b1 and 7b2 are respectively constituted by ceramic dielectric layers 3 and the inner electrode layers 4 which will define the first and second extension portions 4c1 and 4c2. On the other hand, the width-direction first and second outer layer sections 8b1 and 8b2 are constituted only by ceramic dielectric layers 3 and do not include any inner electrode layer 4. Thus, interlayer delamination is likely to occur in the boundary between the first and second extension portions 4c1 and 4c2 and adjacent ceramic dielectric layers 3 in the length-direction first and second outer layer sections 7b1 and 7b2, as discussed above.

Concerning this point, from the viewpoint of significantly reducing or preventing the occurrence of interlayer delamination in the length-direction first and second outer layer sections 7b1 and 7b2, it is preferable that each of the dimensions l1 and l2 of the length-direction first and second outer layer sections 7b1 and 7b2 be greater than the dimensions w1 and w2 of the width-direction first and second outer layer sections 8b1 and 8b2, which are set so that the occurrence of cracks in the width-direction first and second outer layer sections 8b1 and 8b2 is significantly reduced or prevented.

With the above-described configuration, not only the occurrence of cracks in the length-direction first and second outer layer sections 7b1 and 7b2 and the width-direction first and second outer layer sections 8b1 and 8b2 caused by an internal stress can be significantly reduced or prevented, but also the occurrence of interlayer delamination in the length-direction first and second outer layer sections 7b1 and 7b2 caused by an internal stress can be significantly reduced or prevented.

More preferably, each of the dimensions l1 and l2 of the length-direction first and second outer layer sections 7b1 and 7b2 in the length direction L is more than about 1.15 times as large as the dimensions w1 and w2 of the width-direction first and second outer layer sections 8b1 and 8b2 in the width direction W (l1/w1>1.15, l1/w2>1.15, l2/w1>1.15, l2/w2>1.15), for example. With this configuration, it is possible to more reliably reduce or prevent the occurrence of interlayer delamination in the length-direction first and second outer layer sections 7b1 and 7b2 caused by an internal stress.

Figure 6:
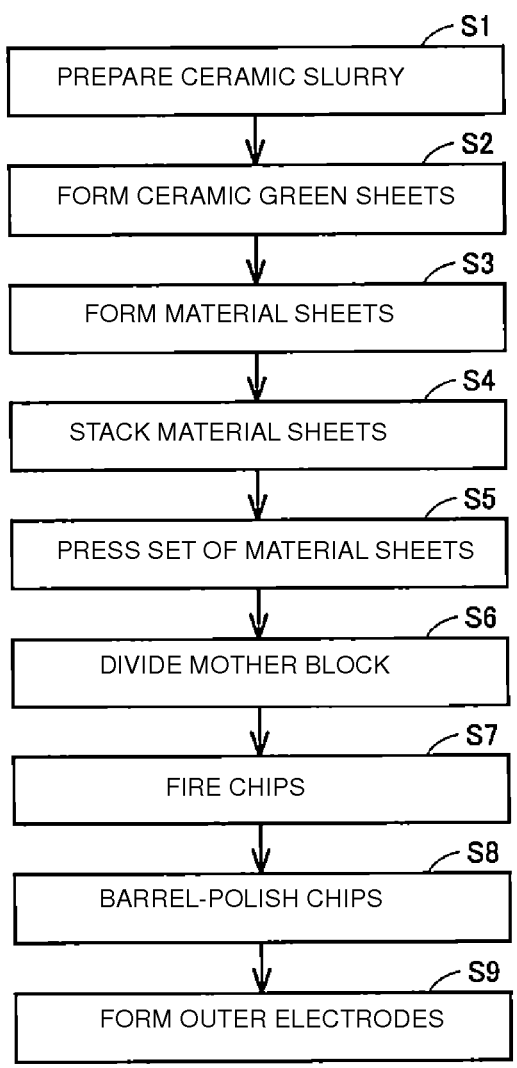
FIG. 6 is a flowchart illustrating a manufacturing flow for the multilayer ceramic capacitor shown in FIG. 1.

FIG. 6 is a flowchart illustrating a non-limiting example of a manufacturing flow for the multilayer ceramic capacitor 1A shown in FIG. 1. The manufacturing flow for the multilayer ceramic capacitor 1A will be discussed below with reference to FIG. 6. In this manufacturing flow, a plurality of multilayer ceramic capacitors 1A are mass-produced together in the following manner. A material which will form a plurality of multilayer ceramic capacitors 1A is processed together until a halfway point through a manufacturing process so as to fabricate a mother block. Then, the mother block is divided into individual chips, and the individual chips are then processed.

The manufacturing process will be discussed below more specifically. In step S1, ceramic slurry is prepared first. More specifically, a ceramic powder, a binder, and a solvent are mixed at a predetermined mixing ratio so as to form ceramic slurry.

Then, in step S2, ceramic green sheets are formed. More specifically, the ceramic slurry is formed into a sheet-shaped shape on a carrier film by using a die coater, a gravure coater, or a micro gravure coater, thereby forming ceramic green sheets.

Then, in step S3, material sheets are formed. More specifically, a conductor paste is printed on each ceramic green sheet by using screen printing or gravure printing such that a predetermined conductor pattern is formed on the ceramic green sheet. As a result, a material sheet having a predetermined conductor pattern on a ceramic green sheet is formed.

Material sheets formed in step S3 will be discussed below in details. FIG. 7 is an exploded perspective view illustrating the multilayer structure of a set of base sheets 11, which will form the body 2 of the multilayer ceramic capacitor 1A shown in FIG. 1.

As shown in FIG. 7, the body 2 is fabricated by using the set of base sheets 11 constituted by a plurality of base sheets 11A, 11B1, and 11B2 which are configured differently. More specifically, the body 2 is fabricated by stacking the plurality of base sheets 11A, 11B1, and 11B2 in a predetermined order and by then fixing them with pressure and firing them.

The base sheet 11A is constituted only by a ceramic base 12 on which no conductor pattern is formed. The base sheet 11A will be used as a ceramic dielectric layer 3 which forms the thickness-direction first or second outer layer section 6b1 or 6b2 after the body 2 is fired.

The base sheets 11B1 and 11B2 are each constituted by a ceramic base 12 on which a conductor pattern 13 having a predetermined shape is formed. The conductor patterns 13 of the base sheets 11B1 and 11B2 will be used as inner electrode layers 4 after the body 2 is fired. The ceramic bases 12 of the base sheets 11B1 and 11B2 will be used as ceramic dielectric layers 3, most of which will form the thickness-direction inner layer section 6a.

The layout of a material sheet formed in step S3 is as follows. By using the base sheet 11B1 or 11B2 shown in FIG. 7 as a unit, a plurality of base sheets having the same shape as that of the base sheet 11B1 or 11B2 which is determined as a unit are two-dimensionally arranged in a matrix.

Since the base sheets 11B1 and 11B2 preferably have the same shape, sheets having the same conductor pattern may be used as material sheets including the base sheets 11B1 and those including the base sheets 11B2. In a step of stacking a set of material sheets, which will be discussed below, material sheets having the same conductor pattern are displaced from each other by half pitch, thereby obtaining the multilayer structure of the base sheets 11B1 and 11B2 shown in FIG. 7.

As material sheets, not only material sheets having the above-described conductor patterns, but also ceramic green sheets which are formed without being subjected to step S3 are also prepared.

Then, referring back to FIG. 6, in step S4, the material sheets are stacked. More specifically, by stacking the plurality of material sheets according to a predetermined rule, the above-described units (base sheets 11B1 and 11B2) are disposed within the stacked material sheets in the stacking direction so as to obtain the multilayer structure shown in FIG. 7.

Then, in step S5, the set of stacked material sheets is fixed with pressure. More specifically, pressure is applied to the set of material sheets in the stacking direction by using, for example, isostatic pressing, thereby fixing the set of material sheets.

Figure 8A:
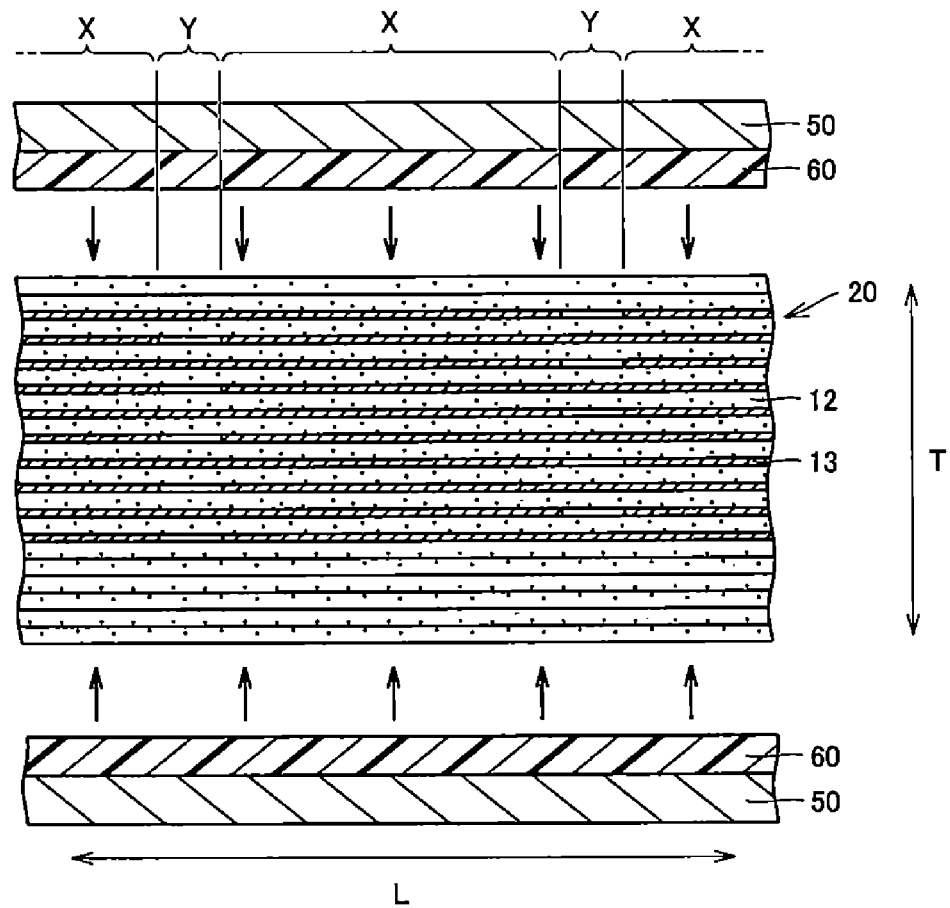
FIGS. 8A through 9B are schematic sectional views illustrating a step of fixing a set of material sheets with pressure in the manufacturing flow shown in FIG. 6.
Figure 8B:
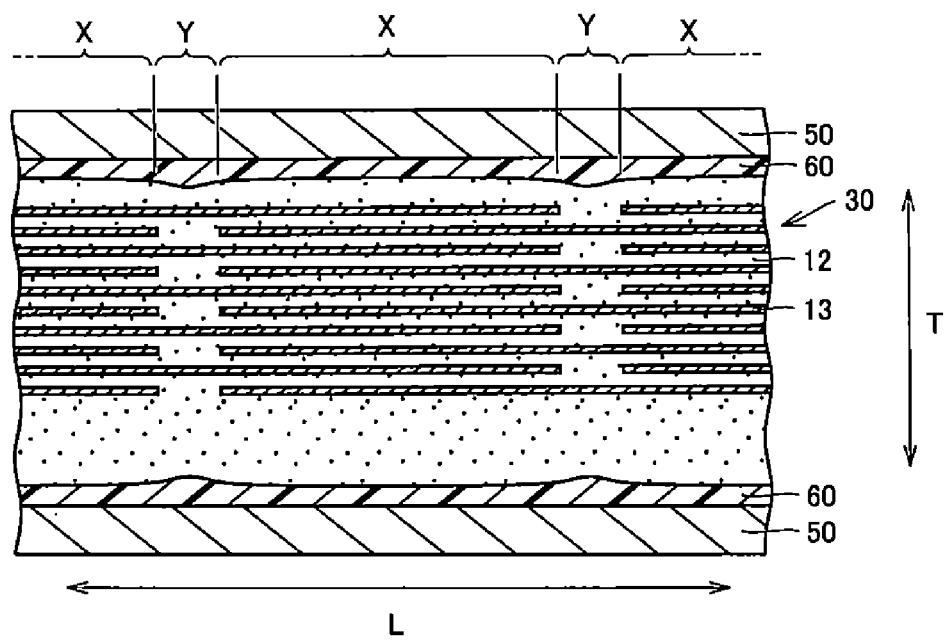
Figure 9A:
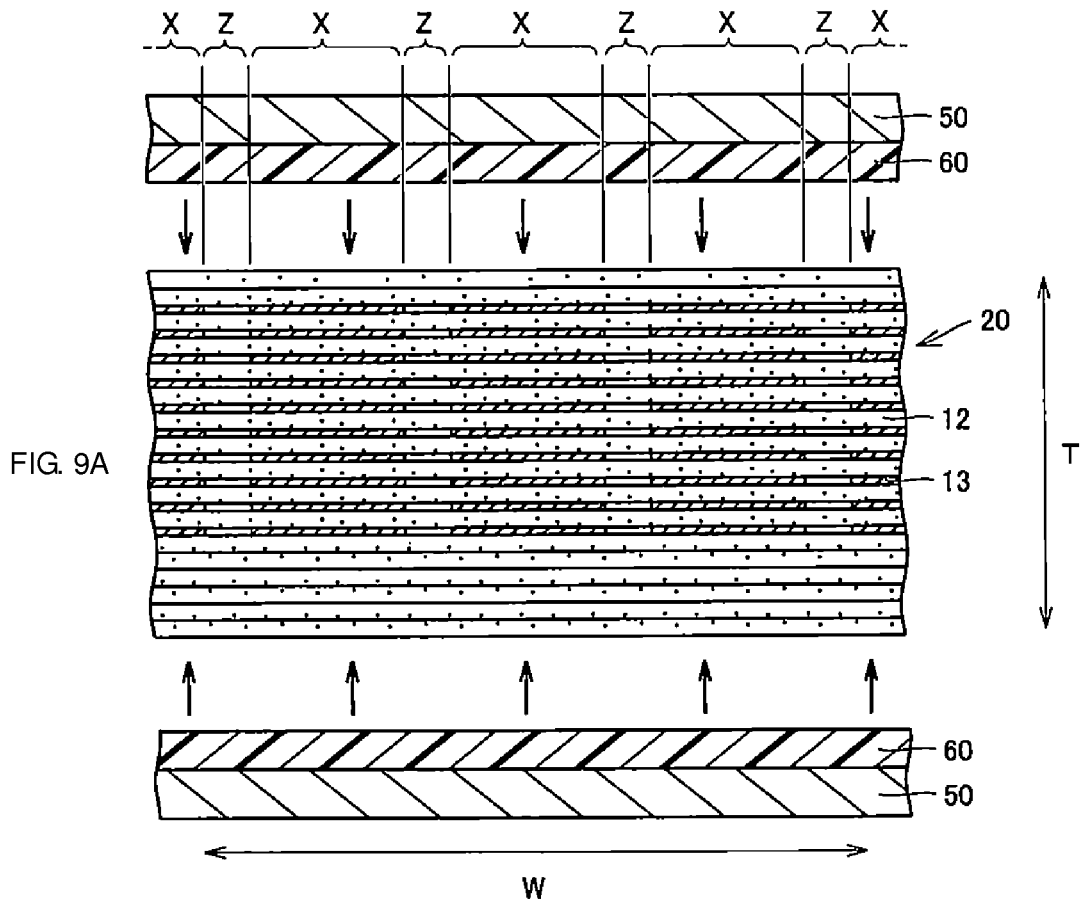
Figure 9B:
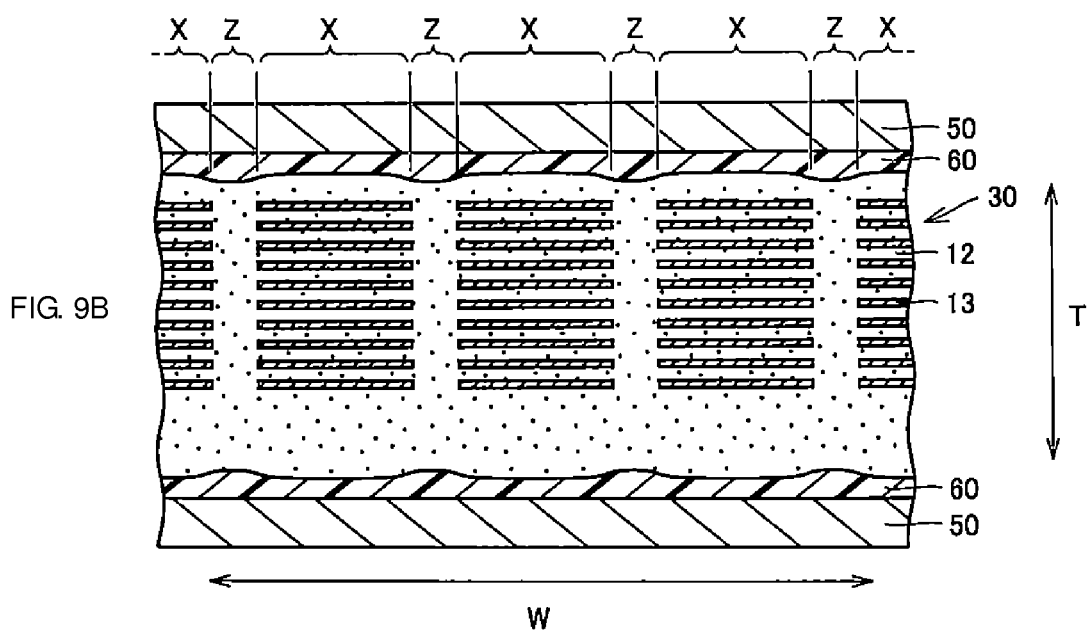

FIGS. 8A through 9B are schematic sectional views illustrating a step of fixing a set of material sheets 20 with pressure in step S5 of FIG. 6. FIGS. 8A and 8B are sectional views along the length direction L of the multilayer ceramic capacitor 1A to be manufactured, and FIGS. 9A and 9B are sectional views along the width direction W thereof. FIGS. 8A and 9A illustrate the state of the set of material sheets 20 which have not yet been fixed with pressure, while FIGS. 8B and 9B illustrate the state of the set of material sheets 20 which have been fixed with pressure.

As shown in FIGS. 8A through 9B, in step S5, the set of material sheets 20 which are stacked according to the predetermined rule are sandwiched between a pair of pressure plates 50 in the stacking direction, and isostatic pressure is applied to the pressure plates 50, thereby fixing the set of material sheets 20.

As shown in FIG. 8A, regions X in which many conductor patterns 13 are disposed and regions Y in which a relatively small number of conductor patterns 13 are disposed are alternately arranged in the length direction L of the set of material sheets 20. The region X will form the length-direction inner layer section 7a of the multilayer ceramic capacitor 1A, while the region Y will form the length-direction first or second outer layer section 7b1 or 7b2 of the multilayer ceramic capacitor 1A.

As shown in FIG. 9A, regions X in which many conductor patterns 13 are disposed and regions Z in which no conductor pattern 13 is disposed are alternately arranged in the width direction W of the set of material sheets 20. The region X will form the width-direction inner layer section 8a of the multilayer ceramic capacitor 1A, while the region Z will form the width-direction first or second outer layer section 8b1 or 8b2 of the multilayer ceramic capacitor 1A.

A sheet-shaped elastic member 60 is interposed between each of the pressure plates 50 and the set of material sheets 20. The sheet-shaped elastic members 60 are used to adjust a pressure force to be applied to the individual regions of the set of material sheets 20 through the pair of pressure plates 50. The sheet-shaped elastic members 60 are made of a resin, for example, rubber.

Since the ceramic bases 12 are made of a ceramic dielectric material, they are relatively soft and are easy to press. In contrast, since the conductor patterns 13 are made of a conductor material, they are relatively hard and are difficult to press. In the regions X, many conductor patterns 13 are densely disposed, and on the other hand, in the regions Y, a smaller number of conductor patterns 13 are disposed than in the regions X, and in the regions Z, no conductor pattern 13 is disposed. Accordingly, the regions X are relatively difficult to press, while the regions Y and Z are relatively easy to press.

Thus, as discussed above, a sheet-shaped elastic member 60 is interposed between each of the pressure plates 50 and the set of material sheets 20. The set of material sheets 20 are fixed with pressure by using the pressure plates 50 via the sheet-shaped elastic members 60, and then, the sheet-shaped elastic members 60 are elastically deformed so as to adjust the pressure force to be applied to the individual regions of the set of material sheets 20.

As discussed above, from the viewpoint of reducing or preventing the occurrence of cracks caused by an internal stress, it is important that the set of material sheets 20 in the regions Y and Z be pressed with a sufficient pressure force in step S5, and in order to implement this, certain ones of the above-described conditions preferably are satisfied.

By pressing the set of material sheets 20 as described above, a mother block 30 shown in FIGS. 8B and 9B is fabricated.

Then, in step S6, the mother block 30 is divided. More specifically, the mother block 30 is divided in a matrix form by push-cutting or dicing, thereby cutting out the above-described individual chips. Each of the chips cut out from the mother block 30 has a multilayer structure, such as that shown in FIG. 7.

Then, in step S7, the chips are fired. More specifically, the chips are heated to a predetermined temperature, thereby performing sintering on the ceramic dielectric material and the conductor material.

Then, in step S8, the chips are barrel-polished. More specifically, the chips subjected to firing are sealed within a small box called a barrel, together with media balls having a higher hardness than the ceramic dielectric material. Then, by rotating the barrel, the chips can be polished. By performing this barrel-polishing, the outer surfaces (in particular, corners) of the chips are curved and rounded. As a result, the above-described body 2 is formed.

Then, in step S9, outer electrodes are formed. More specifically, a conductor paste is applied to end portions including the first and second end surfaces 2b1 and 2b2 of the body 2 so as to form a metal film, and then, sintering processing is performed on the metal film. Then, the metal film is sequentially Ni-plated and Sn-plated. As a result, the first and second outer electrodes 5a and 5b are formed on the outer surfaces of the body 2.

After the above-described series of steps, the multilayer ceramic capacitor 1A configured as shown in FIGS. 1 through 5 is manufactured.

In the multilayer ceramic capacitor 1A of the first preferred embodiment, among the above-described conditions, at least the condition that both of the dimensions w1 and w2 of the width-direction first and second outer layer sections 8b1 and 8b2, respectively, in the width direction W are greater than the dimension t1 of the thickness-direction first outer layer section 6b1 in the thickness direction T is satisfied (w1>t1 and w2>t1).

By forming the multilayer ceramic capacitor 1A of the first preferred embodiment in this manner, as stated above, the adhesion force of the ceramic dielectric material in the width-direction first and second outer layer sections 8b1 and 8b2 is sufficiently increased, thus effectively reducing or preventing the occurrence of cracks caused by an internal stress in these sections. As a result, it is possible to improve the reliability of multilayer ceramic capacitors as products and the yield in a manufacturing process.

Figure 10:
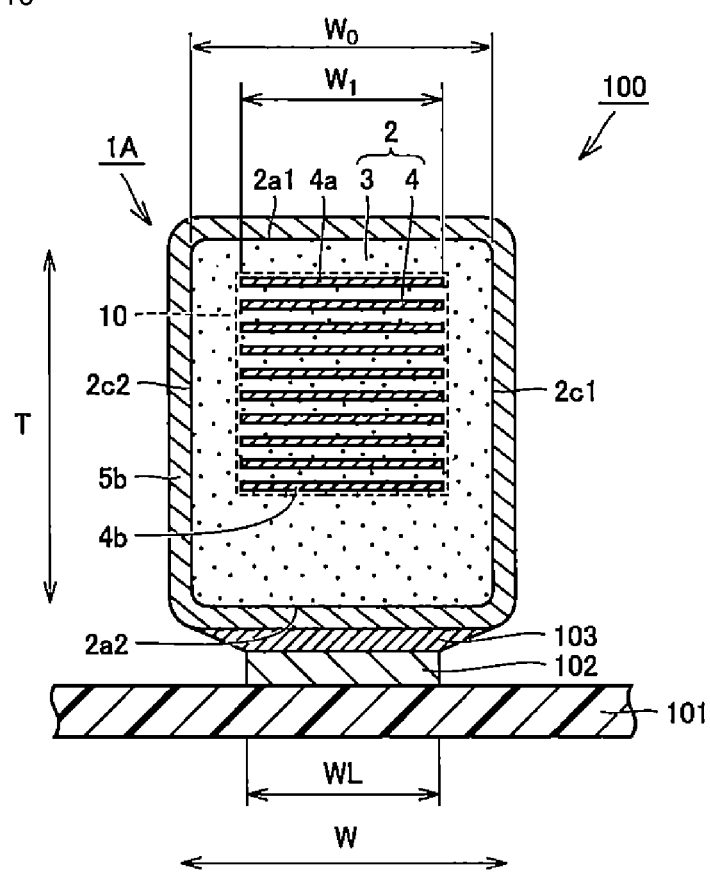
FIG. 10 is a schematic sectional view illustrating a multilayer ceramic capacitor mount body of the first preferred embodiment of the present invention.

FIG. 10 is a sectional view illustrating a multilayer ceramic capacitor mount body 100 of the first preferred embodiment. The multilayer ceramic capacitor mount body 100 will be described below with reference to FIG. 10.

As shown in FIG. 10, the multilayer ceramic capacitor mount body 100 of the first preferred embodiment includes the above-described multilayer ceramic capacitor 1A and a wiring board 101, which defines and serves as a mounting member on which the multilayer ceramic capacitor 1A is mounted. The multilayer ceramic capacitor 1A is mounted on the wiring board 101 such that its second principal surface 2a2 faces the wiring board 101. As the mounting board, a member other than the wiring board 101 may be used.

The configuration of the multilayer ceramic capacitor mount body 100 will be discussed more specifically. A pair of lands 102 is disposed on the surface of the wiring board 101 such that the lands 102 are spaced apart from each other. The first and second outer electrodes 5a and 5b of the multilayer ceramic capacitor 1A are disposed on the lands 102 such that the first outer electrode 5a faces one land 102 and the second outer electrode 5b faces the other land 102. Solder 103, which is a bonding medium, is disposed each of between the first outer electrode 5a and one land 102 and between the second outer electrode 5b and the other land 102, thus bonding the first and second outer electrodes 5a and 5b to the respective lands 102. As the bonding medium, a medium other than the solder 103 may be used.

A dimension WL of the pair of lands 102 in the width direction W is preferably smaller than the dimension W0 of the body 2 in the width direction W. With this configuration, the first and second outer electrodes 5a and 5b are subjected to a compressive stress applied from the solder 103 along the width direction W when the solder 103 is solidified. This compressive stress also acts on a boundary portion between the multilayer unit 10 and the thickness-direction second outer layer section 6b2. Accordingly, with the above-described configuration, the stress acting on this boundary portion is relaxed, thus significantly reducing or preventing the occurrence of cracks in this boundary portion.

Additionally, the dimension WL of the pair of lands 102 in the width direction W is preferably smaller than the dimension W1 of the multilayer unit 10 in the width direction W. With this configuration, when the solder 103 is solidified, the compressive stress acting on the boundary portion between the multilayer unit 10 and the thickness-direction second outer layer section 6b2 is further enhanced. This further relaxes the stress acting on this boundary portion, thus significantly reducing or preventing the occurrence of cracks in this boundary portion more reliably.

Figure 11:
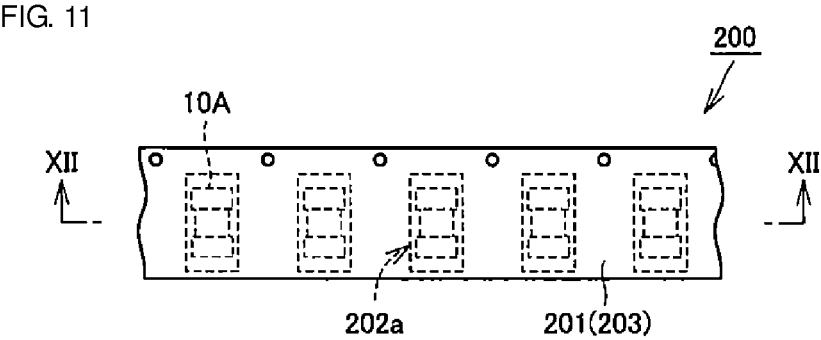
FIG. 11 is a plan view illustrating a multilayer ceramic capacitor array of the first preferred embodiment of the present invention.
Figure 12:
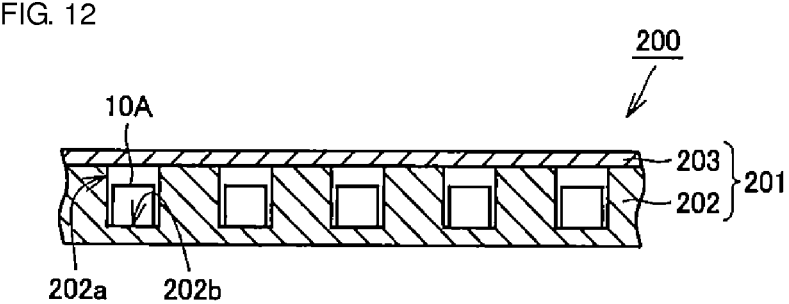
FIG. 12 is a schematic sectional view taken along line XII-XII of FIG. 11.

FIG. 11 is a plan view illustrating a multilayer ceramic capacitor array 200 of the first preferred embodiment. FIG. 12 is a schematic sectional view taken along line XII-XII of FIG. 11. The multilayer ceramic capacitor array 200 of the first preferred embodiment will be described below with reference to FIGS. 11 and 12.

As shown in FIGS. 11 and 12, the multilayer ceramic capacitor array 200 of the first preferred embodiment includes a plurality of multilayer ceramic capacitors 1A discussed above and a package 201 to package the plurality of multilayer ceramic capacitors 1A together therein. The package 201 includes an elongated carrier tape 202 and a cover tape 203. The carrier tape 202 includes a plurality of recessed portions 202a disposed apart from each other and storing the plurality of multilayer ceramic capacitors 1A therein. The cover tape 203 is attached to the carrier tape 202 such that it covers the plurality of recessed portions 202a. The plurality of multilayer ceramic capacitors 1A are stored in the respective recessed portions 202a such that their second principal surfaces 2a2 face bottom portions 202b of the respective recessed portions 202a.

The plurality of multilayer ceramic capacitors 1A contained in the multilayer ceramic capacitor array 200 are extracted from the package 201 one by one and are mounted on the above-described wiring board 101. More specifically, in the state in which the cover tape 203 is removed from the carrier tape 202, the multilayer ceramic capacitors 1A are sucked and held at the side from their first principal surfaces 2a1 by a suction head, such as a chip mounter, so as to be removed from the carrier tape 202 and mounted on the wiring board 101.

As stated above, the multilayer ceramic capacitors 1A are stored in the respective recessed portions 202a such that their second principal surfaces 2a2 face the bottom portions 202b of the respective recessed portions 202a. With this arrangement, a mounting operation using a suction head, such as a chip mounter, can be performed smoothly. Thus, by forming the multilayer ceramic capacitor array 200 of the first preferred embodiment as described above, it is possible to easily manufacture the above-described multilayer ceramic capacitor mount body 100 of the first preferred embodiment.

Second Preferred Embodiment

Figure 13:
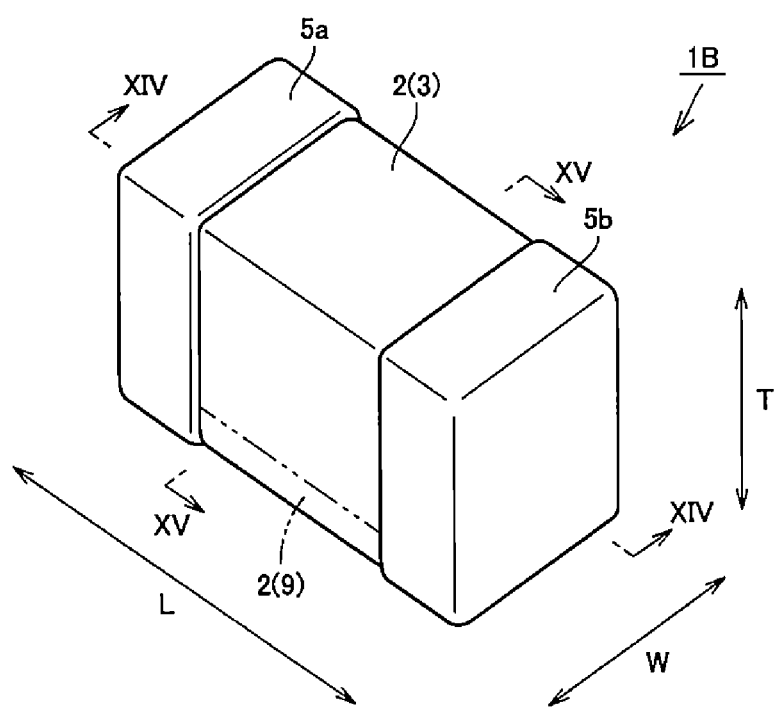
FIG. 13 is a schematic perspective view illustrating a multilayer ceramic capacitor according to a second preferred embodiment of the present invention.
Figure 14:
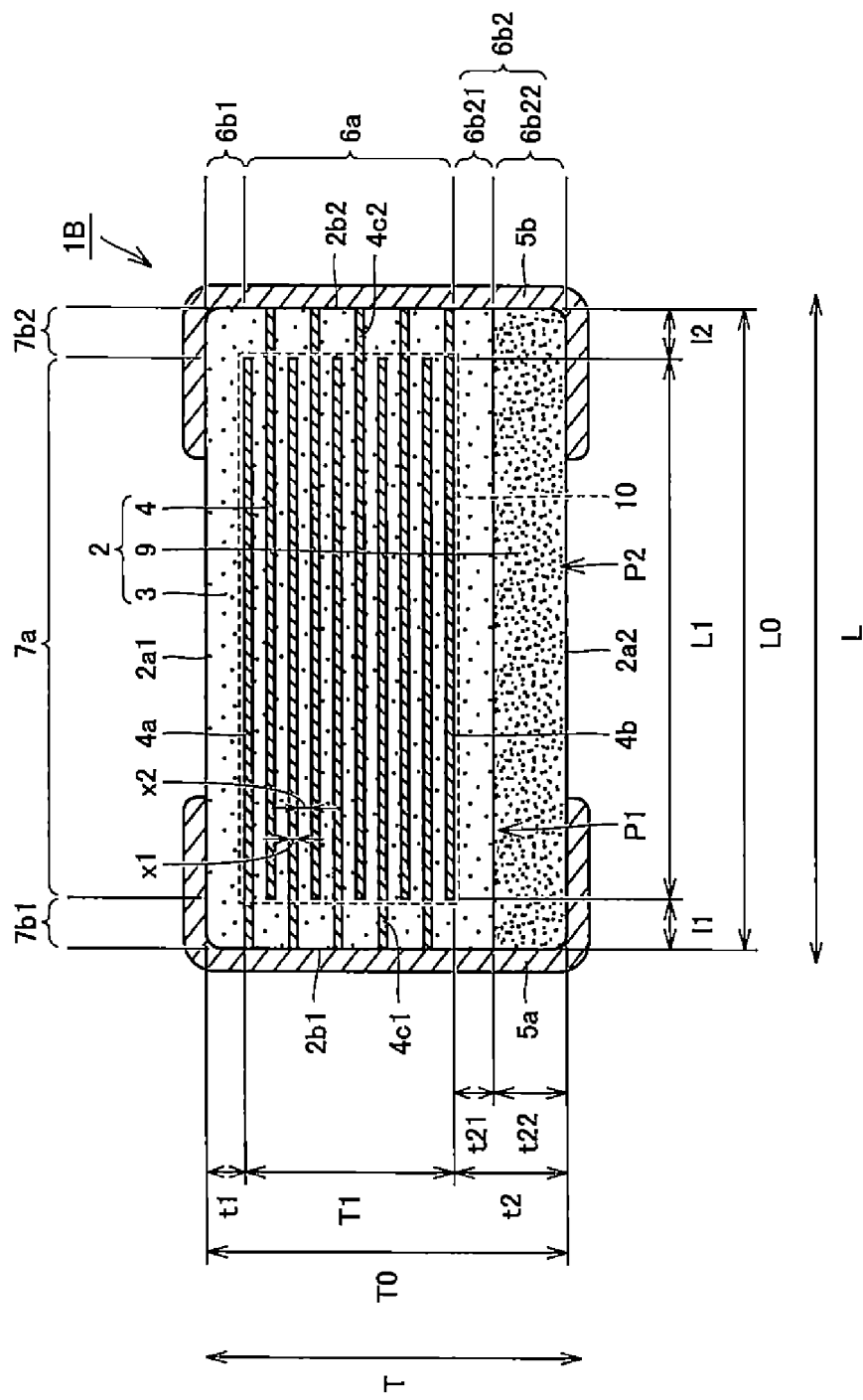
FIGS. 14 and 15 are schematic sectional views taken along lines XIV-XIV and XV-XV, respectively, of FIG. 13.
Figure 15:
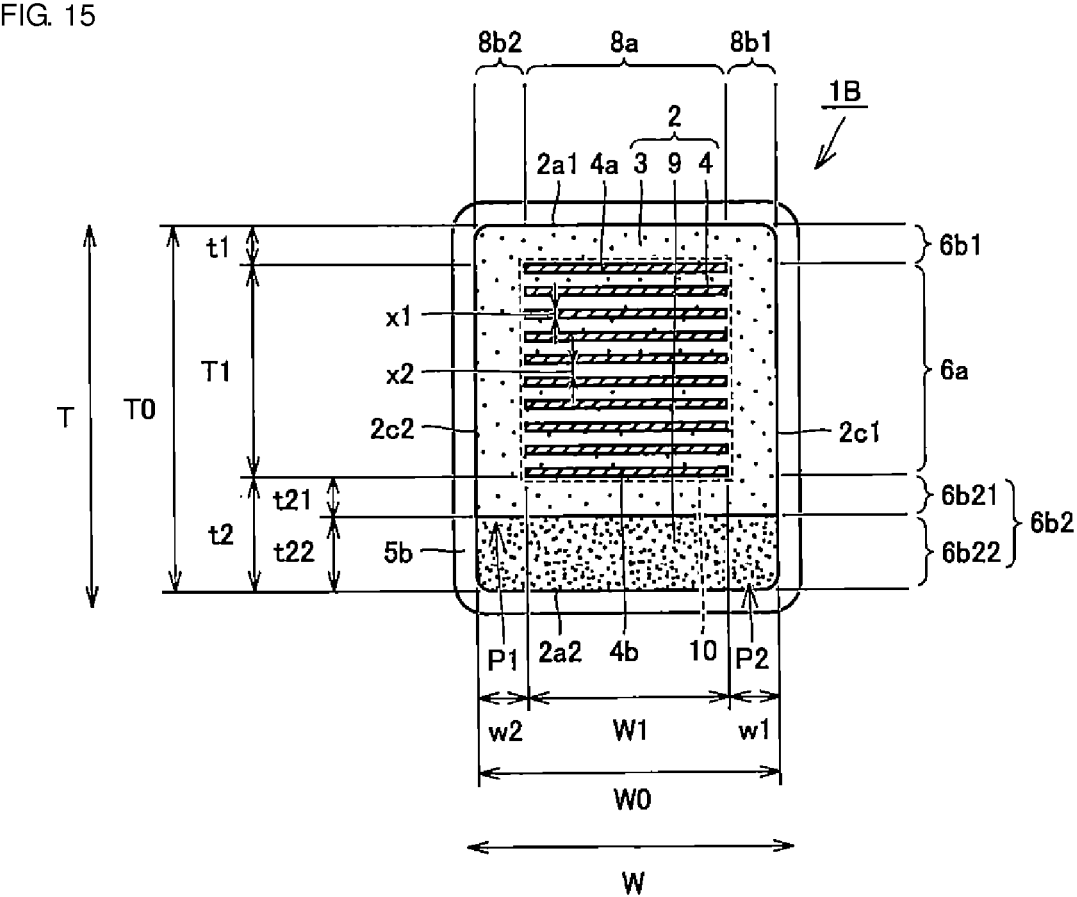

FIG. 13 is a schematic perspective view illustrating a multilayer ceramic capacitor 1B according to a second preferred embodiment of the present invention. FIGS. 14 and 15 are schematic sectional views taken along lines XIV-XIV and XV-XV, respectively, of FIG. 13. The configuration of the multilayer ceramic capacitor 1B of the second preferred embodiment will be described below with reference to FIGS. 13 through 15.

As shown in FIGS. 13 through 15, the multilayer ceramic capacitor 1B of the second preferred embodiment is different from the multilayer ceramic capacitor 1A of the first preferred embodiment in the configuration of the thickness-direction second outer layer section 6b2, for example. More specifically, the thickness-direction second outer layer section 6b2 of the multilayer ceramic capacitor 1B includes an inner portion 6b21 disposed adjacent to the thickness-direction inner layer section 6a and an outer portion 6b22 which is disposed adjacent to the inner portion 6b21 and which defines the second principal surface 2a2.

The inner portion 6b21 is constituted by a ceramic dielectric layer 3 made of a ceramic dielectric material, which preferably is the same type (that is, having the same composition) as that of the thickness-direction inner layer section 6a and the thickness-direction first outer layer section 6b1. The outer portion 6b22 is constituted by a ceramic dielectric layer 9 made of a ceramic dielectric material, which is a different type (that is, having a different composition) from that of the thickness-direction inner layer section 6a and the thickness-direction first outer layer section 6b1.

The ceramic dielectric layers 3 defining the thickness-direction inner layer section 6a, the thickness-direction first outer layer section 6b1, and the inner portion 6b21 and the ceramic dielectric layer 9 defining the outer portion 6b22 contain a perovskite compound expressed by $ABO_3$ ("A" contains Ba and "B" contains Ti) as a principal component. A typical example of a perovskite compound expressed by $ABO_3$ is barium titanate ($BaTiO_3$).

The ceramic dielectric layers 3 defining the thickness-direction inner layer section 6a, the thickness-direction first outer layer section 6b1, and the inner portion 6b21 and the ceramic dielectric layer 9 defining the outer portion 6b22 contain Si as a secondary component. Si is contained in the ceramic dielectric layers 3 and 9 by adding a Si compound, such as glass or $SiO_2$, to a perovskite compound expressed by $ABO_3$. Another compound, such as a Mn compound, an Mg compound, a Co compound, a Ni compound, or a rare earth compound, may be added to a perovskite compound expressed by $ABO_3$.

The composition ratio of Si to Ti contained in the ceramic dielectric layer 9 defining the outer portion 6b22 is higher than that in the ceramic dielectric layers 3 defining the thickness-direction inner layer section 6a, the thickness-direction first outer layer section 6b1, and the inner portion 6b21. The composition ratio is typically represented by a molar ratio. The molar ratio of Si to Ti contained in the ceramic dielectric layer 3 and that in the ceramic dielectric layer 9 may be measured by using a wavelength-dispersive X-ray spectrometer (WDX), for example.

The molar ratio of Si to Ti contained in the ceramic dielectric layer 9 defining the outer portion 6b22 is preferably about 0.013 to about 0.030, for example. If the molar ratio of Si to Ti contained in the ceramic dielectric layer 9 is lower than about 0.013 or higher than about 0.030, the reliability of the outer portion 6b22 may be decreased.

The molar ratio of Si to Ti contained in the ceramic dielectric layer 9 defining the outer portion 6b22 is preferably higher than that in the ceramic dielectric layer 3 defining the inner portion 6b21 by about 0.004 or higher, and more preferably by about 0.008 or higher, for example.

A boundary portion P1 of the outer portion 6b22 with the inner portion 6b21 has a larger Si content than the thickness-direction central portion of the outer portion 6b22. A surface layer portion P2 of the outer portion 6b22 close to the second principal surface 2a2 also has a higher Si content than the thickness-direction central portion of the outer portion 6b22. A determination as to whether or not the boundary portion P1 and the surface layer portion P2 of the outer portion 6b22 have a high Si content ratio may be made by element mapping created by using a field emission wavelength-dispersive X-ray spectrometer (FE-WDX), for example.

In the multilayer ceramic capacitor 1B of the second preferred embodiment, as well as in the multilayer ceramic capacitor 1A of the first preferred embodiment, among the above-described conditions discussed in the first preferred embodiment, at least the condition that both of the dimensions w1 and w2 of the width-direction first and second outer layer sections 8b1 and 8b2, respectively, in the width direction W are greater than the dimension t1 of the thickness-direction first outer layer section 6b1 in the thickness direction T is satisfied (w1>t1 and w2>t1). Thus, advantages similar to those discussed in the first preferred embodiment can also be obtained.

Additionally, of the second preferred embodiment, as stated above, the molar ratio of Si to Ti contained in the ceramic dielectric layer 9 defining the outer portion 6b22 is higher than that in the ceramic dielectric layers 3 defining the thickness-direction inner layer section 6a, the thickness-direction first outer layer section 6b1, and the inner portion 6b21. That is, the outer portion 6b22 contains a greater amount of Si than the inner portion 6b21. The coefficient of thermal shrinkage of a ceramic dielectric layer having a higher Si content ratio is greater than that of a ceramic dielectric layer having a lower Si content ratio. Accordingly, the coefficient of thermal shrinkage of the outer portion 6b22 is greater than that of the inner portion 6b21. Thus, the coefficient of thermal shrinkage of the outer portion 6b22 is closer to that of the inner electrode layers 4 included in the thickness-direction inner layer section 6a.

Thus, in the multilayer ceramic capacitor 1B, it is possible to relax an internal stress which is caused by the difference in the coefficients of thermal shrinkage between the ceramic dielectric layers 3 and the inner electrode layers 4 and which acts on the boundary portion between the thickness-direction inner layer section 6a and the thickness-direction second outer layer section 6b2, thus effectively reducing or preventing the occurrence of cracks in this boundary portion.

If the molar ratio of Si to Ti contained in the ceramic dielectric layer 9 defining the outer portion 6b22 is higher than that in the ceramic dielectric layer 3 defining the inner portion 6b21 by about 0.004 or higher, the occurrence of cracks in this boundary portion is reduced or prevented more effectively. If the above-described molar ratio is higher by about 0.008 or higher, the occurrence of cracks in this boundary portion is reduced or prevented even more effectively.

In the multilayer ceramic capacitor 1B of the second preferred embodiment, if certain ones of the following conditions are satisfied, the occurrence of cracks caused by an internal stress are effectively reduced or prevented, thus improving the reliability of multilayer ceramic capacitors as products and the yield in a manufacturing process. These conditions have been established on the basis of evaluation results of first through fourth verification tests, which will be discussed later.

As shown in FIG. 15, both of dimensions w1 and w2 of the width-direction first and second outer layer sections 8b1 and 8b2, respectively, in the width direction W are preferably greater than a dimension t21 of the inner portion 6b21 of the thickness-direction second outer layer section 6b2 in the thickness direction T (w1>t21 and w2>t21). With this configuration, the adhesion force of the ceramic dielectric material in the width-direction first and second outer layer sections 8b1 and 8b2 significantly increases, thus effectively reducing or preventing the occurrence of cracks caused by an internal stress in these sections.

More preferably, both of the dimensions w1 and w2 of the width-direction first and second outer layer sections 8b1 and 8b2, respectively, in the width direction W are more than about 1.3 times as large as the dimension t21 of the inner portion 6b21 of the thickness-direction second outer layer section 6b2 in the thickness direction T (w1/t21>1.3 and w2/t21>1.3), for example. With this configuration, it is possible to more reliably reduce or prevent the occurrence of cracks caused by an internal stress in the width-direction first and second outer layer sections 8b1 and 8b2.

If the dimension T1 of the multilayer unit 10 in the thickness direction T preferably is about 1.15 times or more as large as the dimension W1 of the multilayer unit 10 in the width direction W (T1/W1≥1.15), both of the dimensions w1 and w2 of the width-direction first and second outer layer sections 8b1 and 8b2, respectively, in the width direction W are preferably more than about 1.5 times as large as the dimension t21 of the inner portion 6b21 of the thickness-direction second outer layer section 6b2 in the thickness direction T (w1/t21>1.5 and w2/t21>1.5). With this configuration, even in the case of T1/W1≥1.15, it is also possible to more reliably reduce or prevent the occurrence of cracks caused by an internal stress in the width-direction first and second outer layer sections 8b1 and 8b2, and in particular, even under the operating environments in which thermal shock is repeatedly applied, high reliability is secured.

As shown in FIG. 14, both of dimensions l1 and l2 of the length-direction first and second outer layer sections 7b1 and 7b2, respectively, in the length direction L are preferably greater than the dimension t21 of the inner portion 6b21 of the thickness-direction second outer layer section 6b2 in the thickness direction T (l1>t21 and l2>t21). With this configuration, the adhesion force of the ceramic dielectric material and the adhesion force between the ceramic dielectric material and the conductor material in the length-direction first and second outer layer sections 7b1 and 7b2 significantly increase, thus effectively reducing or preventing the occurrence of cracks caused by an internal stress in these sections.

More preferably, both of the dimensions l1 and l2 of the length-direction first and second outer layer sections 7b1 and 7b2, respectively, in the length direction L are more than about 1.5 times as large as the dimension t21 of the inner portion 6b21 of the thickness-direction second outer layer section 6b2 in the thickness direction T (l1/t21>1.5 and l2/t21>1.5), for example. With this configuration, it is possible to more reliably reduce or prevent the occurrence of cracks caused by an internal stress in the length-direction first and second outer layer sections 7b1 and 7b2.

If the dimension T1 of the multilayer unit 10 in the thickness direction T is about 0.67 times or more as large as the dimension L1 of the multilayer unit 10 in the length direction L (T1/L1≥0.67), both of the dimensions l1 and l2 of the length-direction first and second outer layer sections 7b1 and 7b2, respectively, in the length direction L are preferably more than twice as large as the dimension t21 of the inner portion 6b21 of the thickness-direction second outer layer section 6b2 in the thickness direction T (l1/t21>2 and l2/t21>2). With this configuration, even in the case of T1/L1≥0.67, it is also possible to more reliably reduce or prevent the occurrence of cracks caused by an internal stress in the length-direction first and second outer layer sections 7b1 and 7b2, and in particular, even under the operating environments in which thermal shock is repeatedly applied, high reliability is secured.

As shown in FIGS. 14 and 15, the dimension t22 of the outer portion 6b22 of the thickness-direction second outer layer section 6b2 in the thickness direction T is preferably equal to or greater than the dimension t21 of the inner portion 6b21 of the thickness-direction second outer layer section 6b2 in the thickness direction T. With this configuration, the above-described stress relaxing effect exhibited by the thermal shrinkage of the outer portion 6b22 is more likely to be produced at the boundary portion between the thickness-direction inner layer section 6a and the thickness-direction second outer layer section 6b2, thus effectively reducing or preventing the occurrence of cracks at this boundary portion.

In FIGS. 14 and 15, the dimension t21 of the inner portion 6b21 of the thickness-direction second outer layer section 6b2 in the thickness direction T is preferably about 20 μm or greater, for example. With this configuration, the diffusion of Si contained in the outer portion 6b22 into the thickness-direction inner layer section 6a is reduced or prevented. If the Si content ratio in the thickness-direction inner layer section 6a is too high, the grain growth of ceramic particles in the ceramic dielectric layers 3 included in the thickness-direction inner layer section 6a accelerates excessively in a step of firing the body 2, thus reducing the withstand voltage characteristics of the ceramic dielectric layers 3. As a result, the thickness-direction inner layer section 6a is more likely to be short-circuited. However, with the above-described configuration, it is possible to significantly reduce or prevent the occurrence of the short-circuiting of the thickness-direction inner layer section 6a by maintaining the withstand voltage characteristics of the ceramic dielectric layers 3 included in the thickness-direction inner layer section 6a.

The dimension t21 of the inner portion 6b21 of the thickness-direction second outer layer section 6b2 in the thickness direction T preferably is smaller than the dimension t1 of the thickness-direction first outer layer section 6b1 in the thickness direction T, for example. Even with this configuration, because of the provision of the outer portion 6b22 outside the inner portion 6b21, the entry of moisture into the thickness-direction inner layer section 6a from the inner portion 6b21 and the outer portion 6b22 is significantly reduced or prevented. Thus, even if the dimension t21 of the inner portion 6b21 of the thickness-direction second outer layer section 6b2 is reduced to be sufficiently small, the reliability is not decreased.

In FIGS. 14 and 15, the dimension t22 of the outer portion 6b22 of the thickness-direction second outer layer section 6b2 in the thickness direction T is preferably about 30 μm or greater, for example. With this configuration, the above-described stress relaxing effect exhibited by the thermal shrinkage of the outer portion 6b22 is produced at the boundary portion between the thickness-direction inner layer section 6a and the thickness-direction second outer layer section 6b2, thus effectively significantly reducing or preventing the occurrence of cracks at this boundary portion.

As discussed above, in the multilayer ceramic capacitor 1B of the second preferred embodiment, the Si content ratio in the boundary portion P1 of the outer portion 6b22 with the inner portion 6b21 and that in the surface layer portion P2 of the outer portion 6b22 close to the second principal surface 2a2 are preferably set to be higher than that in the thickness-direction central portion of the outer portion 6b22. This configuration is implemented preferably by setting a temperature and a gaseous atmosphere at which Si segregates from grain boundaries of ceramic particles in the step of firing the body 2.

More specifically, in the step of firing the body 2, by setting a temperature and a gaseous atmosphere at which Si segregates from grain boundaries of ceramic particles, in the outer portion 6b22 containing a greater amount of Si, the grain growth of ceramic particles is encouraged, and Si segregates from the grain boundaries of coarsened ceramic particles. Segregated Si moves along the grain boundaries of the ceramic particles and concentrates toward the boundary portion P1 and the surface layer portion P2. As a result, the Si content ratio in the boundary portion P1 and that in the surface layer portion P2 of the outer portion 6b22 become higher than that in the thickness-direction central portion of the outer portion 6b22.

The Si content ratio in the boundary portion P1 of the outer portion 6b22 with the inner portion 6b21 is preferably higher than that in the thickness-direction central portion of the outer portion 6b22, thus improving the adhesion force between the outer portion 6b22 and the inner portion 6b21. The reason for this may be as follows. Si which has moved along the grain boundaries of the ceramic particles as described above fills many small gaps at the interface between the outer portion 6b22 and the inner portion 6b21, thus coupling the outer portion 6b22 and the inner portion 6b21 to each other. Accordingly, if the formation of the inner portion 6b21 and the formation of the outer portion 6b22 are separately performed, small gaps may be created at the interface between the inner portion 6b21 and the outer portion 6b22, and the concentration of segregated Si in the boundary portion P1 may be encouraged, thus enhancing the adhesion force between the outer portion 6b22 and the inner portion 6b21.

The Si content ratio in the surface layer portion P2 of the outer portion 6b22 close to the second principal surface 2a2 is preferably higher than that in the thickness-direction central portion of the outer portion 6b22, thus reducing or preventing a decrease in the mechanical strength of the body 2 when forming the first and second outer electrodes 5a and 5b. In the formation of the first and second outer electrodes 5a and 5b, if glass components contained in the first and second outer electrodes 5a and 5b react with the ceramic dielectric material of the body 2, the mechanical strength of the body 2 is decreased. However, if the Si content ratio in the outer portion 6b22 is high, the reaction of glass components contained in the first and second outer electrodes 5a and 5b with the ceramic dielectric material of the body 2 is significantly reduced or prevented.

In each of the ceramic dielectric layers 3 and 9, if a rare earth compound is contained in a perovskite compound expressed by $ABO_3$, which is a principal component, the molar ratio of a rare earth element to Ti in the ceramic dielectric layers 3 defining the thickness-direction inner layer section 6a, the thickness-direction first outer layer section 6b1, and the inner portion 6b21 is preferably higher than that in the ceramic dielectric layer 9 defining the outer portion 6b22. That is, the thickness-direction inner layer section 6a, the thickness-direction first outer layer section 6b1, and the inner portion 6b21 preferably contain a greater amount of rare earth element than the outer portion 6b22.

As a rare earth element, Dy, Gd, Y, or La may be added to improve the functions of the multilayer ceramic capacitor 1B. More specifically, by adding a rare earth element, it is possible to stabilize the capacitor temperature characteristics and to prolong the life of the multilayer ceramic capacitor 1B by maintaining the insulation resistance (IR) value even under a high-temperature load.

A rare earth element is likely to concentrate in a grain boundary of ceramic particles or a segregation layer and also to elute to water-soluble flux. Accordingly, when mounting the multilayer ceramic capacitor 1B, ceramic components containing a rare earth element may elute to an organic acid, such as adipic acid, contained in water-soluble flux used for soldering. In this case, cracks may occur in an outer layer section of the body 2 which is embrittled as a result of the eluting of ceramic components.

Accordingly, the molar ratio of a rare earth element to Ti in the ceramic dielectric layers 3 defining the thickness-direction inner layer section 6a, the thickness-direction first outer layer section 6b1, and the inner portion 6b21 is preferably about 0.003 or higher, and the molar ratio of a rare earth element to Ti in the ceramic dielectric layer 9 defining the outer portion 6b22 is preferably lower than about 0.003, for example. With this configuration, it is possible to stabilize the capacitor temperature characteristics and to prolong the life of the multilayer ceramic capacitor 1B by maintaining the insulation resistance (IR) value even under a high-temperature load, and also to significantly reduce or prevent the occurrence of cracks in the outer portion 6b22, which would be caused by the embrittlement of the outer portion 6b22 as a result of the eluting of ceramic components from the outer portion 6b22.

Although a detailed explanation is omitted, it has been validated, as a result of conducting verification tests (different from first through third verification tests, which will be discussed later) by changing the content of Dy used as a rare earth element, that the above-described advantages were obtained due to the above-described characteristic points. It has also been validated that the advantages were also obtained when Gd, Y, or La was used instead of Dy, for example.

In each of the ceramic dielectric layers 3 and 9, if a Mn compound is contained in a perovskite compound expressed by $ABO_3$, which is a principal component, the molar ratio of a Mn compound to Ti in the ceramic dielectric layers 3 defining the thickness-direction inner layer section 6a, the thickness-direction first outer layer section 6b1, and the inner portion 6b21 is preferably higher than that in the ceramic dielectric layer 9 defining the outer portion 6b22. That is, the thickness-direction inner layer section 6a, the thickness-direction first outer layer section 6b1, and the inner portion 6b21 preferably contain a greater amount of Mn than the outer portion 6b22.

The color of a ceramic dielectric layer containing a smaller amount of Mn is lighter than that containing a greater amount of Mn. With this configuration, the color of the outer portion 6b22 is made brighter than that of the thickness-direction inner layer section 6a, the thickness-direction first outer layer section 6b1, and the inner portion 6b21. It is thus easy to visually distinguish the first and second principal surfaces 2a1 and 2a2 of the multilayer ceramic capacitor 1B from each other.

Accordingly, by performing image processing by capturing an image of the multilayer ceramic capacitor 1B with an imaging camera, the orientation of the multilayer ceramic capacitor 1B in the thickness direction T is capable of being identified. Thus, when mounting the multilayer ceramic capacitor 1B, the orientation of the multilayer ceramic capacitor 1B is capable of being automatically identified so that the second principal surface 2a2 will face a mounting member, such as the wiring board 101.

For example, the molar ratio of Mn to Ti in the ceramic dielectric layers 3 defining the thickness-direction inner layer section 6a, the thickness-direction first outer layer section 6b1, and the inner portion 6b21 is preferably about 0.0008 or higher, and the molar ratio of Mn to Ti in the ceramic dielectric layer 9 defining the outer portion 6b22 is preferably lower than about 0.0008, for example.

Although a detailed explanation is omitted, it has been validated, as a result of conducting verification tests (different from first through third verification tests, which will be discussed later) by changing the content of Mn, that the above-described advantages were obtained due to the above-described characteristic points.

Modified Example

Figure 16:
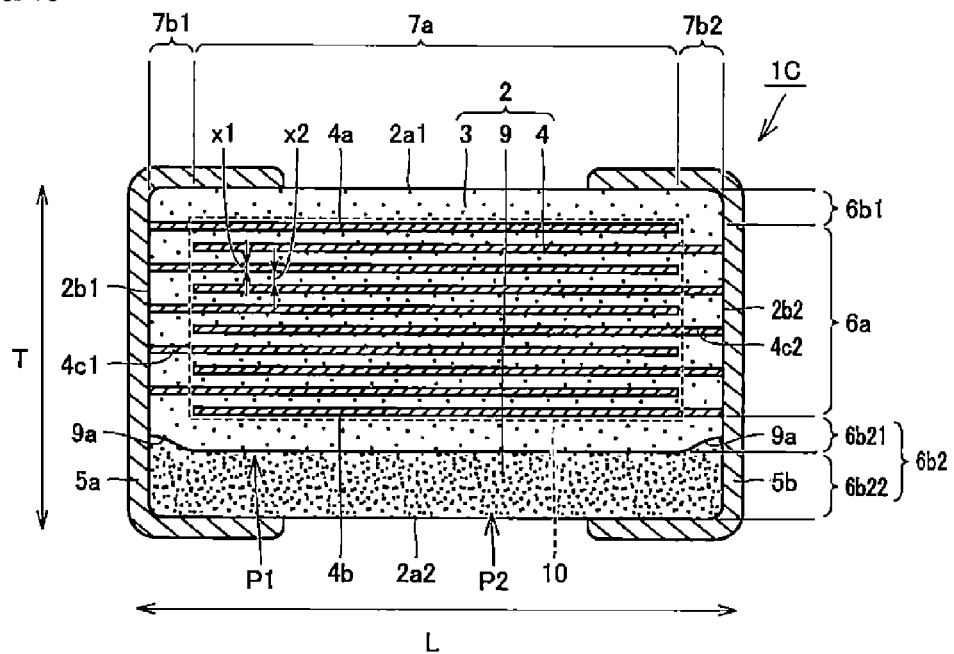
FIGS. 16 and 17 are schematic sectional views illustrating a multilayer ceramic capacitor according to a modified example of the second preferred embodiment of the present invention.
Figure 17:
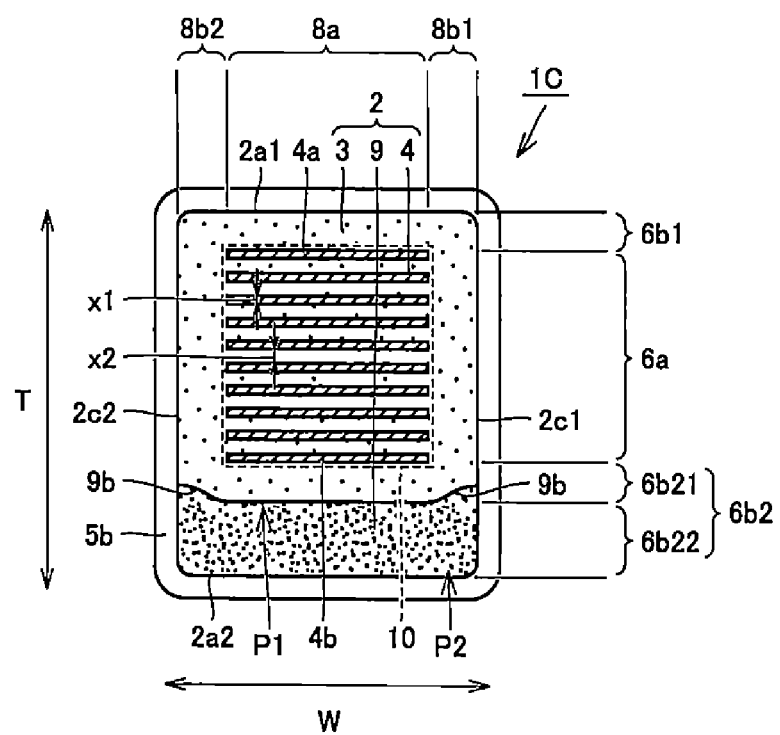

FIGS. 16 and 17 are schematic sectional views illustrating a multilayer ceramic capacitor 1C according to a modified example of the second preferred embodiment of the present invention. The cross sections shown in FIGS. 16 and 17 correspond to those shown in FIGS. 14 and 15, respectively. The multilayer ceramic capacitor 1C of this modified example will be described below with reference to FIGS. 16 and 17.

As shown in FIGS. 16 and 17, the multilayer ceramic capacitor 1C of this modified example is different from the multilayer ceramic capacitor 1B of the second preferred embodiment only in the configuration of the outer portion 6b22 of the thickness-direction second outer layer section 6b2. More specifically, the outer portion 6b22 partially curves and protrudes toward the inner portion 6b21 of the thickness-direction second outer layer section 6b2.

This will be discussed more specifically. As shown in FIG. 16, a portion of the outer portion 6b22 which corresponds to the length-direction first and second outer layer sections 7b1 and 7b2 protrudes toward the inner portion 6b21, thus defining curved-and-swelled portions 9a. As shown in FIG. 17, a portion of the outer portion 6b22 which corresponds to the width-direction first and second outer layer sections 8b1 and 8b2 protrudes toward the inner portion 6b21, thus defining curved-and-swelled portions 9b.

The curved-and-swelled portions 9a and 9b can be formed easily in the following manner, for example. When a base sheet which will be used as the ceramic dielectric layer 9 in the outer portion 6b22 is attached to and pressed against a mother block on which the inner portion 6b21 has already been formed, an elastic member is inserted between the pressure plate and the mother block having this base sheet attached thereto. By suitably adjusting the thickness and the material of the elastic member, the pressure force to be applied, the thickness of the base sheet to be attached, or the configuration of the outer surface of the mother block, the configurations of the curved-and-swelled portions 9a and 9b are adjusted.

In the multilayer ceramic capacitor 1C configured as described above, since the interface between the outer portion 6b22 and the inner portion 6b21 has a non-planar shape, the adhesion force between the outer portion 6b22 and the inner portion 6b21 is increased, thus making it possible to significantly reduce or prevent the occurrence of delamination between the outer portion 6b22 and the inner portion 6b21 in advance, compared with a case in which the interface between the outer portion 6b22 and the inner portion 6b21 has a planar shape. As a result, with this configuration, it is possible to provide a more reliable multilayer ceramic capacitor.

The multilayer ceramic capacitor 1B of the second preferred embodiment and the multilayer ceramic capacitor 1C of the modified example may also be mounted on a mounting member or integrated into a multilayer ceramic capacitor array, in a manner similar to the multilayer ceramic capacitor 1A of the first preferred embodiment of the present invention.

First Verification Test

FIG. 18 is a table illustrating design conditions and evaluation results for multilayer ceramic capacitors of examples 1 through 7 in a first verification test.

In the first verification test, the occurrence of cracks in the body of each of the multilayer ceramic capacitors after being subjected to firing and to a thermal shock test was checked by changing the dimensions w1 and w2 of the width-direction first and second outer layer sections and by changing the dimension T1 of the multilayer unit.

As shown in FIG. 18, in the first verification test, twenty samples of each of seven types of multilayer ceramic capacitors in examples 1 through 7 were fabricated. The multilayer ceramic capacitors of examples 1 through 7 were all fabricated according to the manufacturing flow of the multilayer ceramic capacitor 1A discussed in the first preferred embodiment and were all configured as in the multilayer ceramic capacitor 1A of the first preferred embodiment. It is noted that all the dimensions in the table shown in FIG. 18 are indicated in terms of the design values.

In all of examples 1 through 7, the dimension L0 of the body in the length direction is about 1220 μm, the dimension L1 of the multilayer unit in the length direction is about 1100 μm, and the dimension W1 of the multilayer unit in the width direction is about 640 μm.

In all of examples 1 through 7, the dimension t1 of the thickness-direction first outer layer section is about 40 μm, the dimension t2 of the thickness-direction second outer layer section is about 140 μm, and the dimensions l1 and l2 of the length-direction first and second outer layer sections is about 60 μm.

Concerning the dimension T1 of the multilayer unit in the thickness direction, the dimension T1 in example 1 is about 640 μm, the dimension T1 in examples 2 and 3 is about 677 μm, the dimension T1 in example 4 is about 718 μm, the dimension T1 in examples 5 and 6 is about 736 μm, and the dimension T1 in example is about 834 μm. In accordance with the dimension T1 of examples 1 through 7, concerning the dimension T0 of the body in the thickness direction, the dimension T0 in example 1 is about 820 μm, the dimension T0 in examples 2 and 3 is about 857 μm, the dimension T0 in example 4 is about 898 μm, the dimension T0 in examples 5 and 6 is about 916 μm, and the dimension T0 in example 7 is about 1014 μm.

Concerning the dimensions w1 and w2 of the width-direction first and second outer layer sections, the dimensions w1 and w2 in examples 1 and 2 is about 40 μm, the dimensions w1 and w2 in examples 3 through 5 is about 52 μm, and the dimensions w1 and w2 in examples 6 and 7 is about 60 μm. In accordance with the dimensions w1 and w2 of examples 1 through 7, concerning the dimension W0 of the body in the width direction, the dimension W0 in examples 1 and 2 is about 720 μm, the dimension W0 in examples 3 through 5 is about 744 μm, and the dimension W0 in examples 6 and 7 is about 760 μm.

The ratios of the dimensions of the individual sections in examples 1 through 7 are indicated in the field "dimension ratios" in the table shown in FIG. 18. AR1 is a value expressed by T1/(W0−W1).

In all of examples 1 through 7, the thickness x1 of inner electrode layers included in the multilayer unit subjected to firing is about 0.71 μm, and the thickness x2 of ceramic dielectric layers included in the multilayer unit subjected to firing is about 0.89 μm (that is, x1/x2 is about 0.8). In example 1, the number of inner electrode layers stacked on each other included in the multilayer unit is about 401, while the number of ceramic dielectric layers stacked on each other included in the multilayer unit is about 400. In examples 2 through 7, the number of inner electrode layers and the number of ceramic dielectric layers stacked on each other included in the multilayer unit are equal to or greater than those in example 1.

In the first verification test, among the multilayer ceramic capacitors of examples 1 through 7 fabricated on the basis of the above-described design conditions, concerning ten samples of each of examples 1 through 7, after the body was subjected to firing, a W-T cross section having the center of the multilayer ceramic capacitor and parallel with both of the width direction and the thickness direction of each of the ten samples was exposed by polishing and was observed with an optical microscope so as to check for cracks. The remaining ten samples of each of examples 1 through 7 were input into a thermal shock tester and were subjected to a thermal shock cycle. Then, the above-described W-T cross section was exposed by polishing and was observed with an optical microscope so as to check for cracks.

Concerning the evaluation results of examples 1 through 7, if even one crack was found in the W-T cross sections of the ten samples of each of examples 1 through 7 after the body was subjected to firing, it was determined that cracks occurred (YES), and if none of cracks were found, it was determined that cracks did not occur (NO). Similarly, if even one crack was found in the W-T cross sections of the ten samples of each of examples 1 through 7 after the body was subjected to a thermal shock cycle, it was determined that cracks occurred (YES), and if none of cracks were found, it was determined that cracks did not occur (NO).

As a result, as indicated in the evaluation results in FIG. 18, in examples 1, 3, 4, 6, and 7, it was determined that cracks occurred neither in the samples subjected to firing nor the samples subjected to a thermal shock cycle (NO). In example 2, it was determined that cracks occurred (YES) in both of the samples subjected to firing and the samples subjected to a thermal shock cycle. In example 5, it was determined that cracks did not occur (NO) in the samples subjected to firing and it was determined that cracks occurred (YES) in the samples subjected to a thermal shock cycle.

It is seen from the above-described results that cracks which may occur when the body is subjected to firing are effectively reduced or prevented if both of the dimensions w1 and w2 of the width-direction first and second outer layer sections are greater than the dimension t1 of the thickness-direction first outer layer section (w1>t1 and w2>t1).

It is also seen from the above-described results that cracks which may occur when the body is subjected to firing are more effectively reduced or prevented if both of the dimensions w1 and w2 of the width-direction first and second outer layer sections are more than about 1.3 times as large as the dimension t1 of the thickness-direction first outer layer section (w1/t1>1.3 and w2/t1>1.3).

It is also seen from the above-described results that the occurrence of cracks in the body under the operating environments, as well as when the body is subjected to firing, are effectively reduced or prevented if both of the dimensions w1 and w2 of the width-direction first and second outer layer sections are more than about 1.5 times as large as the dimension t1 of the thickness-direction first outer layer section (w1/t1>1.5 and w2/t1>1.5) in a case in which the dimension T1 of the multilayer unit in the thickness direction is about 1.15 times or more as large as the dimension W1 of the multilayer unit in the width direction (T1/W1≥1.15).

It is also seen from the above-described results that the occurrence of cracks in the body under the operating environments, as well as when the body is subjected to firing, are effectively reduced or prevented when the dimension W0 of the body in the width direction, the dimension T1 of the multilayer unit in the thickness direction, and the dimension W1 of the multilayer unit in the width direction satisfy the relationship expressed by AR1(=T1/(W0−W1))≤6.95.

Second Verification Test

FIG. 19 is a table illustrating design conditions and evaluation results for multilayer ceramic capacitors of examples 8 through 14 in a second verification test.

In the second verification test, the occurrence of cracks in the body of each of the multilayer ceramic capacitors after being subjected to firing and to a thermal shock test was checked by changing the dimensions l1 and l2 of length-direction first and second outer layer sections and by changing the dimension T1 of a multilayer unit in the thickness direction.

As shown in FIG. 19, in the second verification test, twenty samples of each of seven types of multilayer ceramic capacitors of examples 8 through 14 were fabricated. The multilayer ceramic capacitors of examples 8 through 14 were all fabricated according to the manufacturing flow of the multilayer ceramic capacitor 1A discussed in the first preferred embodiment and were all configured as in the multilayer ceramic capacitor 1A of the first preferred embodiment. It is noted that all the dimensions in the table shown in FIG. 19 are indicated in terms of the design values.

In all of examples 8 through 14, the dimension W0 of the body in the width direction is about 752 μm, the dimension L1 of the multilayer unit in the length direction is about 1100 μm, and the dimension W1 of the multilayer unit in the width direction is about 640 μm.

In all of examples 8 through 14, the dimension t1 of the thickness-direction first outer layer section is about 40 μm, the dimension t2 of the thickness-direction second outer layer section is about 140 μm, and the dimensions w1 and w2 of the width-direction first and second outer layer sections is about 56 μm.

Concerning the dimension T1 of the multilayer unit in the thickness direction, the dimension T1 in example 8 is about 640 μm, the dimension T1 in examples 9 and 10 is about 677 μm, the dimension T1 in example 11 is about 718 μm, the dimension T1 in examples 12 and 13 is about 736 μm, and the dimension T1 in example 14 is about 834 μm. In accordance with the dimension T1 of examples 8 through 14, concerning the dimension T0 of the body in the thickness direction, the dimension T0 in example 8 is about 820 μm, the dimension T0 in examples 9 and 10 is about 857 μm, the dimension T0 in example 11 is about 898 μm, the dimension T0 in examples 12 and 13 is about 916 μm, and the dimension T0 in example 14 is about 1014 μm.

Concerning the dimensions l1 and l2 of the length-direction first and second outer layer sections, the dimensions l1 and l2 in examples 8 and 9 is about 40 μm, the dimensions l1 and l2 in examples 10 through 12 is about 60 μm, and the dimensions l1 and l2 in examples 13 and 14 is about 80 μm. In accordance with the dimensions l1 and l2 of examples 8 through 14, concerning the dimension L0 of the body in the length direction, the dimension L0 in examples 8 and 9 is about 1180 μm, the dimension L0 in examples 10 through 12 is about 1220 μm, and the dimension L0 in examples 13 and 14 is about 1260 μm.

The ratios of the dimensions of the individual sections in examples 8 through 14 are indicated in the field "dimension ratios" in the table shown in FIG. 19. AR2 is a value expressed by T1/(L0−L1).

In all of examples 8 through 14, the thickness x1 of inner electrode layers included in the multilayer unit subjected to firing is about 0.71 μm, and the thickness x2 of ceramic dielectric layers included in the multilayer unit subjected to firing is about 0.89 μm (that is, x1/x2 is about 0.8). In example 8, the number of inner electrode layers stacked on each other included in the multilayer unit is about 401, while the number of ceramic dielectric layers stacked on each other included in the multilayer unit is about 400. In examples 9 through 14, the number of inner electrode layers and the number of ceramic dielectric layers stacked on each other included in the multilayer unit are equal to or greater than those in example 8.

In the second verification test, among the multilayer ceramic capacitors of examples 8 through 14 fabricated on the basis of the above-described design conditions, concerning ten samples of each of examples 8 through 14, after the body was subjected to firing, an L-T cross section having the center of the multilayer ceramic capacitor and parallel with both of the length direction and the thickness direction of each of the ten samples was exposed by polishing and was observed with an optical microscope so as to check for cracks. The remaining ten samples of each of examples 8 through 14 were input into a thermal shock tester and were subjected to a thermal shock cycle. Then, the above-described L-T cross section was exposed by polishing and was observed with an optical microscope so as to check for cracks.

Concerning the evaluation results of examples 8 through 14, if even one crack was found in the L-T cross sections of the ten samples of each of examples 8 through 14 after the body was subjected to firing, it was determined that cracks occurred (YES), and if none of cracks were found, it was determined that cracks did not occur (NO). Similarly, if even one crack was found in the L-T cross sections of the ten samples of each of examples 8 through 14 after the body was subjected to a thermal shock cycle, it was determined that cracks occurred (YES), and if none of cracks were found, it was determined that cracks did not occur (NO).

As a result, as indicated in the evaluation results in FIG. 19, in examples 8, 10, 11, 13, and 14, it was determined that cracks occurred neither in the samples subjected to firing nor the samples subjected to a thermal shock cycle (NO). In example 9, it was determined that cracks occurred (YES) in both of the samples subjected to firing and the samples subjected to a thermal shock cycle. In example 12, it was determined that cracks did not occur (NO) in the samples subjected to firing and it was determined that cracks occurred (YES) in the samples subjected to a thermal shock cycle.

It is seen from the above-described results that the occurrence of cracks when the body is subjected to firing is effectively reduced or prevented if both of the dimensions l1 and l2 of the length-direction first and second outer layer sections are greater than the dimension t1 of the thickness-direction first outer layer section (l1>t1 and l2>t1).

It is also seen from the above-described results that the occurrence of cracks when the body is subjected to firing is more effectively reduced or prevented if both of the dimensions l1 and l2 of the length-direction first and second outer layer sections are more than about 1.5 times as large as the dimension t1 of the thickness-direction first outer layer section (l1/t1>1.5 and l2/t1>1.5).

It is also seen from the above-described results that the occurrence of cracks in the body under the operating environments, as well as when the body is subjected to firing, are effectively reduced or prevented if both of the dimensions l1 and l2 of the length-direction first and second outer layer sections are more than twice as large as the dimension t1 of the thickness-direction first outer layer section (l1/t1>2 and l2/t1>2) in a case in which the dimension T1 of the multilayer unit in the thickness direction is about 0.67 times or more as large as the dimension L1 of the multilayer unit in the length direction (T1/L1≥0.67).

It is also seen from the above-described results that cracks which may occur in the body under the operating environments, as well as when the body is subjected to firing, are effectively reduced or prevented if the dimension L0 of the body in the length direction, the dimension T1 of the multilayer unit in the thickness direction, and the dimension L1 of the multilayer unit in the length direction satisfy the relationship expressed by AR2 (=T1/(L0−L1))≤5.98.

Third Verification Test

FIG. 20 is a table illustrating design conditions and evaluation results for multilayer ceramic capacitors of examples 15 through 35 in a third verification test.

In the third verification test, multilayer ceramic capacitors including a thickness-direction second outer layer section constituted by an inner layer and an outer layer, as discussed in the second preferred embodiment, were fabricated. Then, the occurrence of cracks in the body of each of the multilayer ceramic capacitors and the reliability of the multilayer ceramic capacitors after being subjected to firing were checked by changing the dimensions of the inner layer and the outer layer in the thickness direction and by changing the content of Si in each of the inner layer and the outer layer.

As shown in FIG. 20, in the first verification test, twenty samples of each of twenty-one types of multilayer ceramic capacitors of examples 15 through 35 were fabricated. The multilayer ceramic capacitors of examples 15 through 35 were all fabricated according to the non-limiting example of the manufacturing flow of the multilayer ceramic capacitor 1A discussed in the first preferred embodiment and were all configured as in the multilayer ceramic capacitor 1B of the second preferred embodiment. It is noted that all the dimensions in the table shown in FIG. 20 are indicated in terms of the design values.

In all of examples 15 through 35, the dimension t1 of the thickness-direction first outer layer section is about 40 µm, the dimension t2 of the thickness-direction second outer layer section is about 100 µm, and the dimension T1 of the multilayer unit in the thickness direction is about 620 µm.

In all of examples 15 through 35, the thickness x1 of each of inner electrode layers included in the multilayer unit subjected to firing is about 0.8 µm and the number of inner electrode layers stacked on each other is about 330. In all of examples 15 through 35, the molar ratio of Si to Ti contained in the ceramic dielectric layer defining the inner layer (more specifically, the thickness-direction inner layer section, the thickness-direction first outer layer section, and the inner layer) is about 0.013.

Concerning the molar ratio of Si to Ti contained in the ceramic dielectric layer defining the outer layer of the thickness-direction second outer layer section, the molar ratio in examples 15 through 21 is about 0.017, the molar ratio in examples 22 through 28 is about 0.029, and the molar ratio in examples 29 through 35 is about 0.033. The difference between the Si content in the ceramic dielectric layer defining the inner layer and that in the ceramic dielectric layer defining the outer layer in each of examples 1 through 21 is indicated in the table shown in FIG. 20.

Concerning the dimension t21 of the inner layer of the thickness-direction second outer layer section, in each of a group of examples 15 through 21, a group of examples 22 through 28, and a group of examples 29 through 35, the dimension t21 sequentially ranges from about 10 µm to 70 µm in increments of +10 µm.

Concerning the dimension t22 of the outer layer of the thickness-direction second outer layer section, in each of a group of examples 15 through 21, a group of examples 22 through 28, and a group of examples 29 through 35, the dimension t22 sequentially ranges from about 90 µm to 30 µm in increments of −10 µm.

In the third verification test, among the multilayer ceramic capacitors of examples 15 through 35 fabricated on the basis of the above-described design conditions, concerning ten samples of each of examples 15 through 35, after the body was subjected to firing, a W-T cross section including the center of the multilayer ceramic capacitor and parallel with both of the width direction and the thickness direction of each of the ten samples was exposed by polishing and was observed with an optical microscope so as to check for cracks. The remaining ten samples of each of examples 15 through 35 were input into a super-accelerating life tester so as to check the reliability of each of the ten samples. In this reliability test, a voltage of 8 V was continuously applied to each of the samples in an ambient temperature of 150° C., and then, the time taken for the IR value of each of the samples to reduce to 10 kΩ was measured.

Concerning the evaluation results of examples 15 through 35, if even one crack was found in the W-T cross sections of the ten samples of each of examples 15 through 35 after the body was subjected to firing, it was determined that cracks occurred (YES), and if none of cracks were found, it was determined that cracks did not occur (NO). Similarly, as a result of conducting the reliability test by inputting the ten samples of each of examples 15 through 35 into the super-accelerating life tester, if the time for the IR value of each of the samples to reduce to 10 kΩ was ten hours or longer, it was determined that the reliability was "GOOD", and if the time for the IR value of each of the samples to reduce to 10 kΩ was shorter than ten hours, it was determined that the reliability was "BAD".

As a result, as indicated in the evaluation results in FIG. 20, in examples 15 through 19, 22 through 26, and 29 through in which the dimension t22 of the outer layer of the thickness-direction second outer layer section is equal to or greater than the dimension t21 of the inner layer of the thickness-direction second outer layer section, it was determined that cracks occurred neither in the samples subjected to firing nor in the samples subjected to the reliability test (NO). In all of examples 15 through 19, 22 through 26, and 29 through 33 in which it was determined that cracks did not occur (NO), it was determined that the reliability was "GOOD", except for example 29 in which the molar ratio of Si to Ti contained in the ceramic dielectric layer defining the outer layer was higher than about 0.029 and the dimension t21 of the inner layer was smaller than about 20 μm.

It is seen from the above-described results that cracks which may occur after the body is subjected to firing are effectively reduced or prevented if the dimension t22 of the outer layer of the thickness-direction second outer layer section is equal to or greater than the dimension t21 of the inner layer of the thickness-direction second outer layer section. It is also seen from the above-described results that, if the dimension t21 of the inner layer of the thickness-direction second outer layer section is about 20 μm or greater, for example, it is possible to significantly reduce or prevent the occurrence of the short-circuiting of the thickness-direction inner layer section by maintaining the withstand voltage characteristics of the ceramic dielectric layers included in the thickness-direction inner layer section.

Fourth Verification Test

Figure 22:
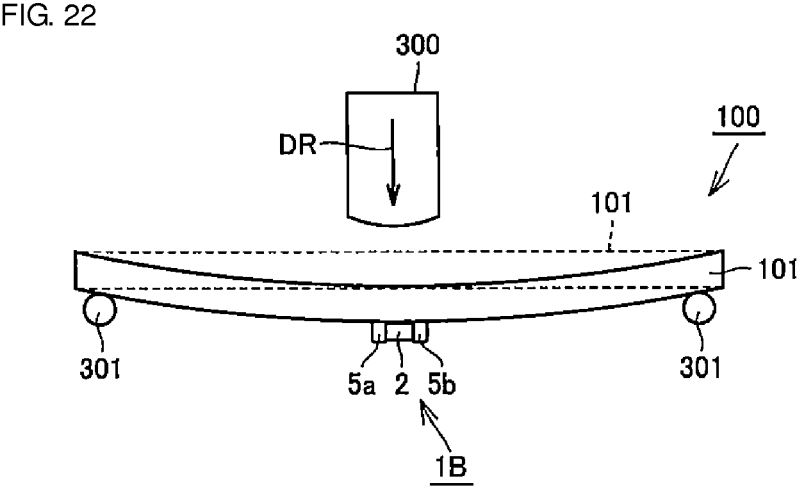
FIG. 22 is a schematic view illustrating a method for deflecting a wiring board having a multilayer ceramic capacitor mounted thereon in the fourth verification test.

FIG. 21 is a table illustrating design conditions and evaluation results for multilayer ceramic capacitors of examples through 39 in a fourth verification test. FIG. 22 is a schematic view illustrating a method for deflecting a wiring board having a multilayer ceramic capacitor mounted thereon in the fourth verification test.

In the fourth verification test, multilayer ceramic capacitors including a thickness-direction second outer layer section including an inner layer and an outer layer, as discussed in the second preferred embodiment, were fabricated. Then, the occurrence of cracks in the body of each of the multilayer ceramic capacitors after the application of an external stress was checked by changing the content of Si in each of the inner layer and the outer layer.

As shown in FIG. 21, in the fourth verification test, ten samples of each of four types of multilayer ceramic capacitors of examples 36 through 39 were fabricated. The multilayer ceramic capacitors of examples 36 through 39 were all fabricated according to the manufacturing flow of the multilayer ceramic capacitor 1A discussed in the first preferred embodiment and were all configured as in the multilayer ceramic capacitor 1B of the second preferred embodiment. It is noted that all the dimensions in the table shown in FIG. 21 are indicated in terms of the design values.

In all of examples 36 through 39, the dimension t1 of the thickness-direction first outer layer section is about 100 μm, the dimension t2 of the thickness-direction second outer layer section is about 100 μm, and the dimension T1 of the multilayer unit in the thickness direction is about 620 μm.

In all of examples 36 through 39, the dimension t21 of the inner layer of the thickness-direction second outer layer section is about 50 μm, and the dimension t22 of the outer layer of the thickness-direction second outer layer section is about 50 μm. The thickness x1 of each of inner electrode layers included in the multilayer unit subjected to firing is about 0.8 μm and the number of inner electrode layers stacked on each other is about 330.

Concerning the molar ratio of Si to Ti contained in the ceramic dielectric layer defining the inner layer (more specifically, the ceramic dielectric layers defining the thickness-direction inner layer section, the thickness-direction first outer layer section, and the inner layer), the molar ratio in examples 36 and 38 is about 0.013, the molar ratio in example is about 0.017, and the molar ratio in example 39 is about 0.029.

Concerning the molar ratio of Si to Ti contained in the ceramic dielectric layer defining the outer layer, the molar ratio in examples 36 and 37 is about 0.017, and the molar ratio in examples 38 and 39 is about 0.029. The difference between the Si content in the ceramic dielectric layer defining the inner layer and that in the ceramic dielectric layer defining the outer layer in each of examples 36 through 39 is indicated in the table shown in FIG. 21.

In the fourth verification test, concerning the ten samples of the multilayer ceramic capacitors of each of examples through 39 fabricated on the basis of the above-described design conditions, after the multilayer ceramic capacitors were mounted on respective mounting members and an external stress was applied to the mounting members, the occurrence of cracks reaching an inner electrode layer of each of the multilayer ceramic capacitors was checked.

In this case, the following method was used to apply an external stress to the mounting members, as shown in FIG. 22. A wiring board 101, which defines and serves as a mounting member, having the multilayer ceramic capacitor 1B mounted thereon was disposed such that the multilayer ceramic capacitor 1B faced downward. The wiring board 101 was supported at both sides by support members 301 from below. In this state, a pressing tool 300 was vertically pressed against the top surface of the wiring board 101 from upward toward the direction indicated by the arrow DR in FIG. 22 so as to deflect the wiring board 101 downward. By deflecting the wiring board 101 with this method, a tensile stress, which is an external stress, was applied to the multilayer ceramic capacitor 1B via solder and the first and second outer electrodes 5a and 5b.

After applying an external stress to the ten samples of the multilayer ceramic capacitors of each of examples 22 through 25 by using this method, the multilayer ceramic capacitors were demounted from the respective wiring boards. Then, cross sections of the multilayer ceramic capacitors of the ten samples were exposed by polishing and were observed with an optical microscope so as to check for cracks reaching an inner electrode layer.

Concerning the evaluation results of examples 36 through 39, as a result of observing the cross sections, if even one crack reaching an inner electrode layer was found in the cross sections of the ten samples of each of examples 36 through 39, it was determined that cracks occurred (YES), and if none of cracks reaching an inner electrode layer were found, it was determined that cracks did not occur (NO).

As a result, as indicated in the evaluation results in FIG. 21, in examples 36 and 38 in which the Si content in the ceramic dielectric layer defining the inner layer and that in the ceramic dielectric layer defining the outer layer differed from each other, it was determined that cracks reaching an inner electrode layer did not occur (NO), but on the other hand, in examples 37 and 39 in which the Si content in the ceramic dielectric layer defining the inner layer and that in the ceramic dielectric layer defining the outer layer did not differ from each other, it was determined that cracks reaching an inner electrode layer occurred (YES).

It is seen from the above-described results that, by setting the amount of Si content in the ceramic dielectric layer defining the outer layer to be higher than that in the ceramic dielectric layer defining the inner layer, a boundary portion having a higher Si content ratio is provided in the outer layer. As a result, the development of cracks is significantly reduced or prevented, or the direction in which cracks develop changes, thus preventing cracks from reaching an inner electrode layer.

Measurement methods for dimensions of individual sections of a multilayer ceramic capacitor will be discussed below.

Figure 23:
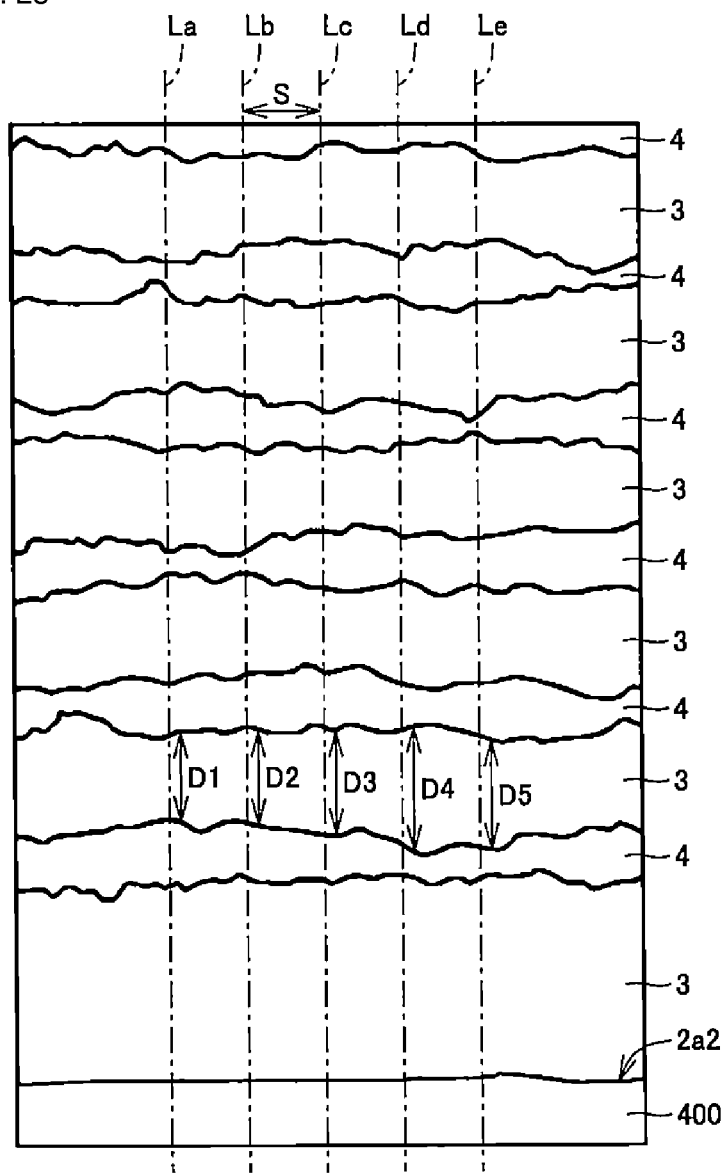
FIG. 23 illustrates an example of an enlarged image of a cross section of a multilayer ceramic capacitor observed with a scanning electron microscope (SEM).

FIG. 23 illustrates an example of an enlarged image of a cross section of a multilayer ceramic capacitor observed with a scanning electron microscope (SEM). In FIG. 23, a portion of the second principal surface 2a2 of the multilayer ceramic capacitor in contact with an embedding resin 400 is shown.

When measuring the thickness of a ceramic dielectric layer 3 and a conductive layer (inner electrode layer) 4 of a multilayer ceramic capacitor, the following method is preferably used. In an enlarged image of a cross section of the multilayer ceramic capacitor observed with a SEM, as shown in FIG. 23, a straight line Lc extending in the thickness direction of a body of the multilayer ceramic capacitor and passing through the center of the body is drawn. Then, a plurality of straight lines parallel with the straight line Lc are drawn at equal pitches S. The pitch S may be set to be about five to ten times as long as the thickness of the ceramic dielectric layer 3 or that of the conductive layer 4 to be measured, for example. If, for example, the ceramic dielectric layer 3 having a thickness of about 1 μm is measured, the pitch S preferably is set to be about 5 μm. Then, lines are drawn on both sides of the straight line Lc. The number of lines drawn on one side and that on the other side of the straight line Lc are the same. That is, an odd number of lines including the straight line Lc are drawn. In FIG. 23, an example in which five straight lines La through Le are drawn is shown.

Then, on each of the lines La through Le, the thickness of a ceramic dielectric layer 3 and that of a conductive layer 4 are measured. If, on each of the straight lines La through Le, a conductive layer 4 is partially missing and ceramic dielectric layers 3 join each other with the conductive layer 4 therebetween, or if an enlarged image at a portion to be measured is not clear, the thickness or the distance is measured on another straight line separated from the straight line Lc.

When measuring the thickness of a ceramic dielectric layer 3, as shown in FIG. 21, the thickness D1 on the straight line La, the thickness D2 on the straight line Lb, the thickness D3 on the straight line Lc, the thickness D4 on the straight line Ld, and the thickness D5 on the straight line Le are measured, and the average value thereof is set to be the thickness of the ceramic dielectric layer 3.

When calculating the average thickness of a plurality of ceramic dielectric layers included in a multilayer unit, the thicknesses of a total of five ceramic dielectric layers constituted by the ceramic dielectric layer positioned substantially at the center of the multilayer unit in the thickness direction and two ceramic dielectric layers positioned at each of both sides of this ceramic dielectric layer are measured by using the above-described method, and the average value thereof is set to be the average thickness of the plurality of ceramic dielectric layers included in the multilayer unit.

If the number of ceramic dielectric layers stacked on each other is less than five, the thicknesses of all the ceramic dielectric layers are measured by using the above-described method, and the average value thereof is set to be the average thickness of the ceramic dielectric layers. If the number of conductive layers stacked on each other is less than five, the thicknesses of all the conductive layers are measured by using the above-described method, and the average value thereof is set to be the average thickness of the conductive layers.

An example of the method for measuring the dimensions of the width-direction first and second outer layer sections is as follows. A W-T cross section including the center of the body and parallel with both of the width direction and the thickness direction is exposed by polishing and is observed with an optical microscope. Then, the widthwise dimension of a portion adjacent to the conductive layer positioned closest to the first principal surface and/or the widthwise dimension of a portion adjacent to the conductive layer positioned closest to the second principal surface are measured.

An example of the method for measuring the dimensions of the length-direction first and second outer layer sections is as follows. An L-T cross section including the center of the body and parallel with both of the length direction and the thickness direction is exposed by polishing and is observed with an optical microscope. Then, the longitudinal dimension of a portion adjacent to the conductive layer positioned closest to the first principal surface and/or the longitudinal dimension of a portion adjacent to the conductive layer positioned closest to the second principal surface are measured.

An example of the method for measuring the dimension of the multilayer unit in the width direction is as follows. A W-T cross section including the center of the body and parallel with both of the width direction and the thickness direction is exposed by polishing and is observed with an optical microscope. Then, the largest dimension of the conductive layer in the width direction is measured.

An example of the method for measuring the dimension of the multilayer unit in the thickness direction is as follows. A W-T cross section including the center of the body and parallel with both of the width direction and the thickness direction is exposed by polishing and is observed with an optical microscope. Then, the length of the shortest line segment including the center of the body and connecting the conductive layer positioned closest to the first principal surface and the conductive layer positioned closest to the second principal surface is measured as the dimension of the multilayer unit in the thickness direction.

An example of the method for measuring the dimensions of the thickness-direction first and second outer layer sections and the dimensions of the inner layer and the outer layer of the thickness-direction second outer layer section is as follows. A W-T cross section including the center of the body and parallel with both of the width direction and the thickness direction is exposed by polishing and is observed with an optical microscope. Then, the thicknesses of the thickness-direction first and second outer layer sections and those of the inner layer and the outer layer of the thickness-direction second outer layer section substantially at the center of the body in the width direction are measured.

Analysis methods for the compositions of the individual sections of a multilayer ceramic capacitor will be described below.

Analysis for the composition of components contained in ceramic dielectric layers may be conducted by using inductively coupled plasma (ICP) emission spectrometry or a WDX, for example. If elemental analysis is conducted by using ICP emission spectrometry, a sample is formed into a powder and is dissolved with an acid. Then, the resulting solution is subjected to ICP emission spectrometry, thereby specifying the composition. If elemental analysis is conducted by using a WDX, the above-described W-T cross section is exposed by polishing the body embedded in a resin, and then, the composition is specified by using a WDX attached to a SEM.

The above-described boundary portion of the outer layer having a high Si content may be identified as follows. The above-described W-T cross section is exposed by polishing the body embedded in a resin, and a backscattered electron image of the exposed cross section is captured by using a SEM and is observed. Alternatively, the boundary portion may be identified by creating element mapping of the exposed cross section by using a WDX attached to a SEM and by specifying a portion having a high Si content.

Figure 24:
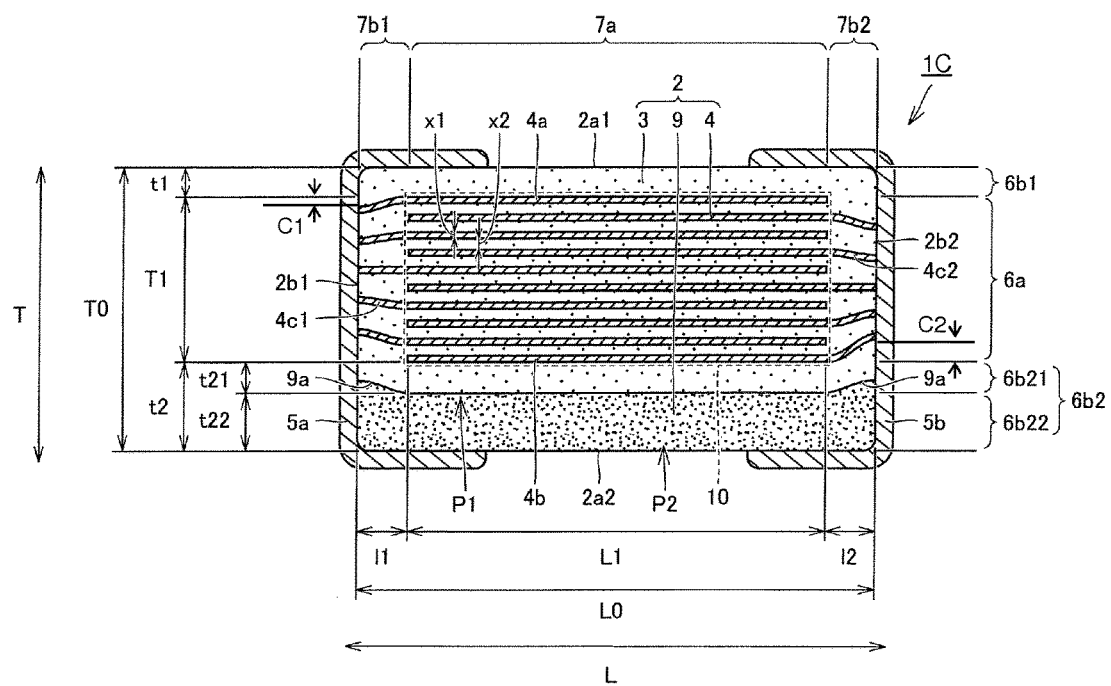
FIG. 24 is a schematic sectional view illustrating a multilayer ceramic capacitor according to a modification of the second preferred embodiment of the present invention.

FIG. 24 is a schematic sectional view illustrating a multilayer ceramic capacitor 1C according to a modification of the second preferred embodiment of the present invention.

As shown in FIG. 24, a body 2 of the multilayer ceramic capacitor 1C includes a first outermost layer 4a, which is the conductive layer disposed closest to the first principal surface 2a1 among the conductive layers connected to either one of the first and second outer electrodes 5a and 5b. Also, the body 2 of the multilayer ceramic capacitor 1C includes a second outermost layer 4b, which is the conductive layer disposed closest to the second principal surface 2a2 among the conductive layers connected to either one of the first and second outer electrodes 5a and 5b.

The first extension portion 4c1 of the first outermost layer 4a is inclined toward the second principal surface 2a2. With this configuration, it is possible to reduce or prevent the occurrence of cracks around the boundary between the thickness-direction inner layer section 6a and the thickness-direction first outer layer section 6b1.

The second extension portion 4c2 of the second outermost layer 4b is inclined toward the first principal surface 2a1. With this configuration, it is possible to reduce or prevent the occurrence of cracks around the boundary between the thickness-direction inner layer section 6a and the thickness-direction second outer layer section 6b2.

The cracks around the boundary between the thickness-direction inner layer section 6a and the thickness-direction second outer layer section 6b2 is easier to occur than the cracks around the boundary between the thickness-direction inner layer section 6a and the thickness-direction first outer layer section 6b1. That is because the thickness-direction second outer layer section 6b2 is thicker than the thickness-direction first outer layer section 6b1.

Therefore, an inclination amount C2 is preferably greater than an inclination amount C1 (C2>C1). More preferably, the difference between C1 and C2 is preferably greater than a thickness of a ceramic dielectric layer 3. The inclination amount C1 refers to the distance in the thickness direction T between both ends of the extension portion 4c1, while the inclination amount C2 refers to the distance in the thickness direction T between both ends of the extension portion 4c2.

The inclination amount C2 of the second extension portion 4c2 is preferably greater than a thickness of a portion of a ceramic dielectric layer 3 adjacent to the second outermost layer 4b and included in the multilayer unit 10. With this configuration, it is possible to even more reliably reduce or prevent the occurrence of cracks around the boundary between the thickness-direction inner layer section 6a and the thickness-direction second outer layer section 6b2.

While preferred embodiments and modified examples thereof according to the present invention have been described above, it is not intended to be exhaustive or to limit the present invention to the precise forms disclosed. It is to be understood that variations and modifications will be apparent to those skilled in the art without departing from the scope and spirit of the present invention. The scope of the present invention, therefore, is to be determined solely by the following claims and their equivalents.

What is claimed is:

1. A multilayer ceramic capacitor comprising:
a body including conductive layers and ceramic dielectric layers alternately stacked on each other in a thickness direction; and
a plurality of outer electrodes disposed on portions of the body; wherein
the body includes first and second principal surfaces opposing each other in the thickness direction, first and second end surfaces opposing each other in a length direction, and first and second side surfaces opposing each other in a width direction;
the plurality of outer electrodes includes a first outer electrode covering at least the first end surface and a second outer electrode covering at least the second end surface;
some of the conductive layers include a first effective portion and a first extension portion extending from the first effective portion toward the first end surface and connecting to the first outer electrode, and others of the conductive layers include a second effective portion and a second extension portion extending from the second effective portion toward the second end surface and connecting to the second outer electrode;
the body includes a multilayer unit including an effective portion defined by the first and second effective portions and portions of the ceramic dielectric layers stacked therebetween;
the body is sectioned in the thickness direction into a thickness-direction first outer layer section that includes one of the ceramic dielectric layers including the first principal surface, a thickness-direction second outer layer section that includes one of the ceramic dielectric layers including the second principal surface, and a thickness-direction inner layer section that includes the multilayer unit and that is disposed between the thickness-direction first and second outer layer sections;
the body is sectioned in the length direction into a length-direction first outer layer section that includes the first extension portions and portions of the ceramic dielectric layers sandwiched by the first extension portions and that defines the first end surface, a length-direction second outer layer section that includes the second extension portions and portions of the ceramic dielectric layers sandwiched by the second extension portions and that defines the second end surface, and a length-direction inner layer section that includes the multilayer unit and that is disposed between the length-direction first and second outer layer sections;

the body is sectioned in the width direction into a width-direction first outer layer section that includes a portion between the first side surface and the multilayer unit, a width-direction second outer layer section that includes a portion between the second side surface and the multilayer unit, and a width-direction inner layer section that includes the multilayer unit and that is disposed between the width-direction first and second outer layer sections;

a dimension of the thickness-direction second outer layer section in the thickness direction is greater than a dimension of the thickness-direction first outer layer section in the thickness direction;

the ceramic dielectric layers in the thickness-direction inner layer section and the thickness-direction first and second outer layer sections contain barium titanate and Si;

the thickness-direction second outer layer section includes an outer portion which includes the second principal surface and an inner portion disposed between the thickness-direction inner layer section and the outer portion;

a composition ratio of Si to Ti in one of the ceramic dielectric layers included in the outer portion is higher than a composition ratio of Si to Ti in one of the ceramic dielectric layers included in the inner portion;

a boundary portion between the outer portion and the inner portion has a larger Si content than the outer portion;

the inner portion has a higher composition ratio of Mn to Ti than the outer portion; and each of minimum dimensions in the length direction of the length-direction first and second outer layer sections is greater than both minimum dimensions in the width direction of the width-direction first and second outer layer sections.

2. The multilayer ceramic capacitor according to claim 1, wherein the ceramic dielectric layers included in the multilayer unit have a higher composition ratio of rare earth element to Ti than the outer portion.

3. The multilayer ceramic capacitor according to claim 1, wherein the ceramic dielectric layers included in the multilayer unit have a higher composition ratio of Dy to Ti than the outer portion.

4. The multilayer ceramic capacitor according to claim 1, wherein a dimension in the thickness direction of the outer portion is greater than a dimension in the thickness direction of the inner portion.

5. A multilayer ceramic capacitor comprising:
a body including conductive layers and ceramic dielectric layers alternately stacked on each other in a thickness direction; and
a plurality of outer electrodes disposed on portions of the body; wherein
the body includes first and second principal surfaces opposing each other in the thickness direction, first and second end surfaces opposing each other in a length direction, and first and second side surfaces opposing each other in a width direction;
the plurality of outer electrodes includes a first outer electrode covering at least the first end surface and a second outer electrode covering at least the second end surface;
some of the conductive layers include a first effective portion and a first extension portion extending from the first effective portion toward the first end surface and connecting to the first outer electrode, and others of the conductive layers include a second effective portion and a second extension portion extending from the second effective portion toward the second end surface and connecting to the second outer electrode;

the body includes a multilayer unit including an effective portion defined by the first and second effective portions and portions of the ceramic dielectric layers stacked therebetween;

the body is sectioned in the thickness direction into a thickness-direction first outer layer section that includes one of the ceramic dielectric layers including the first principal surface, a thickness-direction second outer layer section that includes one of the ceramic dielectric layers including the second principal surface, and a thickness-direction inner layer section that includes the multilayer unit and that is disposed between the thickness-direction first and second outer layer sections;

the body is sectioned in the length direction into a length-direction first outer layer section that includes the first extension portions and portions of the ceramic dielectric layers sandwiched by the first extension portions and that defines the first end surface, a length-direction second outer layer section that includes the second extension portions and portions of the ceramic dielectric layers sandwiched by the second extension portions and that defines the second end surface, and a length-direction inner layer section that includes the multilayer unit and that is disposed between the length-direction first and second outer layer sections;

the body is sectioned in the width direction into a width-direction first outer layer section that includes a portion between the first side surface and the multilayer unit, a width-direction second outer layer section that includes a portion between the second side surface and the multilayer unit, and a width-direction inner layer section that includes multilayer unit and that is disposed between the width-direction first and second outer layer sections;

a dimension of the thickness-direction second outer layer section in the thickness direction is greater than a dimension of the thickness-direction first outer layer section in the thickness direction;

the ceramic dielectric layers in the thickness-direction inner layer section and the thickness-direction first and second outer layer sections contain barium titanate and Si;

the thickness-direction second outer layer section includes an outer portion which includes the second principal surface and an inner portion disposed between the thickness-direction inner layer section and the outer portion;

a composition ratio of Si to Ti in one of the ceramic dielectric layers included in the outer portion is higher than a composition ratio of Si to Ti in one of the ceramic dielectric layers included in the inner portion;

a boundary portion between the outer portion and the inner portion has a larger Si content than the outer portion;

the inner portion has a higher composition ratio of Mn to Ti than the outer portion;

each of minimum dimensions in the length direction of the length-direction first and second outer layer sections is more than about 1.15 times as large as both minimum dimensions in the width direction of the width-direction first and second outer layer sections.

6. The multilayer ceramic capacitor according to claim 5, wherein the ceramic dielectric layers included in the multilayer unit have a higher composition ratio of rare earth element to Ti than the outer portion.

7. The multilayer ceramic capacitor according to claim 5, wherein the ceramic dielectric layers included in the multilayer unit have a higher composition ratio of Dy to Ti than the outer portion.

8. The multilayer ceramic capacitor according to claim 5, wherein a dimension in the thickness direction of the outer portion is greater than a dimension in the thickness direction of the inner portion.

9. A multilayer ceramic capacitor comprising:
a body including conductive layers and ceramic dielectric layers alternately stacked on each other in a thickness direction; and
a plurality of outer electrodes disposed on portions of the body; wherein
the body includes first and second principal surfaces opposing each other in the thickness direction, first and second end surfaces opposing each other in a length direction, and first and second side surfaces opposing each other in a width direction;
the plurality of outer electrodes includes a first outer electrode covering at least the first end surface and a second outer electrode covering at least the second end surface;
some of the conductive layers include a first effective portion and a first extension portion extending from the first effective portion toward the first end surface and connecting to the first outer electrode, and others of the conductive layers include a second effective portion and a second extension portion extending from the second effective portion toward the second end surface and connecting to the second outer electrode;
the body includes a multilayer unit including an effective portion defined by the first and second effective portions and portions of the ceramic dielectric layers stacked therebetween;
the body is sectioned in the thickness direction into a thickness-direction first outer layer section that includes one of the ceramic dielectric layers including the first principal surface, a thickness-direction second outer layer section that includes one of the ceramic dielectric layers including the second principal surface, and a thickness-direction inner layer section that includes the multilayer unit and that is disposed between the thickness-direction first and second outer layer sections;
the body is sectioned in the length direction into a length-direction first outer layer section that includes the first extension portions and portions of the ceramic dielectric layers sandwiched by the first extension portions and that defines the first end surface, a length-direction second outer layer section that includes the second extension portions and portions of the ceramic dielectric layers sandwiched by the second extension portions and that defines the second end surface, and a length-direction inner layer section that includes the multilayer unit and that is disposed between the length-direction first and second outer layer sections;
the body is sectioned in the width direction into a width-direction first outer layer section that includes a portion between the first side surface and the multilayer unit, a width-direction second outer layer section that includes a portion between the second side surface and the multilayer unit, and a width-direction inner layer section that includes multilayer unit and that is disposed between the width-direction first and second outer layer sections;
a dimension of the thickness-direction second outer layer section in the thickness direction is greater than a dimension of the thickness-direction first outer layer section in the thickness direction;
the thickness-direction inner layer section and the thickness-direction first and second outer layer sections contain barium titanate and Si;
the ceramic dielectric layers included in the thickness-direction second outer layer section includes an outer portion which includes the second principal surface and an inner portion disposed between the thickness-direction inner layer section and the outer portion;
a composition ratio of Si to Ti in one of the ceramic dielectric layers included in the outer portion is higher than a composition ratio of Si to Ti in one of the ceramic dielectric layers included in the inner portion;
a boundary portion between the outer portion and the inner portion has a larger Si content than the outer portion;
the inner portion has a higher composition ratio of Mn to Ti than the outer portion;
each of minimum dimensions in the length direction of the length-direction first and second outer layer sections is greater than both minimum dimensions in the width direction of the width-direction first and second outer layer sections;
one of the first and second extension portions of a first outermost conductive layer of the conductive layers that is closest to the first principal surface is inclined toward the second principal surface;
one of the first and second extension portions of a second outermost conductive layer of the conductive layers that is closest to the second principal surface is inclined toward the first principal surface; and
an amount of inclination of the second outermost conductive layer is greater than an amount of inclination of the first outermost conductive layer.

10. The multilayer ceramic capacitor according to claim 9, wherein a difference between the amount of inclination of the second outermost conductive layer and the amount of inclination of the first outermost conductive layer is greater than a thickness of the dielectric layer stacked between the conductive layers.

11. The multilayer ceramic capacitor according to claim 9, wherein the ceramic dielectric layers included in the multilayer unit have a higher composition ratio of rare earth element to Ti than the outer portion.

12. The multilayer ceramic capacitor according to claim 9, wherein the ceramic dielectric layers included in the multilayer unit have a higher composition ratio of Dy to Ti than the outer portion.

13. The multilayer ceramic capacitor according to claim 9, wherein a dimension of the outer portion in the thickness direction is greater than a dimension of the inner portion in the thickness direction.

* * * * *